United States Patent
Kai et al.

(10) Patent No.: US 7,292,787 B1
(45) Date of Patent: Nov. 6, 2007

(54) SELECTED-WAVELENGTH TUNING FILTER AND OPTICAL ADD/DROP MULTIPLEXER

(75) Inventors: Yutaka Kai, Kawasaki (JP); Hiroshi Onaka, Kawasaki (JP); Yoshihiro Saito, Yokohama (JP); Kazumasa Kubotera, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/495,708

(22) Filed: Feb. 1, 2000

(30) Foreign Application Priority Data

Feb. 19, 1999 (JP) .......................... HEI 11-042082

(51) Int. Cl.
*H04B 10/00* (2006.01)

(52) U.S. Cl. .......................................... 398/85; 398/83

(58) Field of Classification Search ................ 359/311; 398/79–88
See application file for complete search history.

(56) References Cited

U.S. PATENT DOCUMENTS

| | | | | |
|---|---|---|---|---|
| 4,622,845 A | * | 11/1986 | Ryan et al. ................ 73/24.02 |
| 5,002,349 A | * | 3/1991 | Cheung et al. ................ 385/1 |
| 5,216,484 A | * | 6/1993 | Chao et al. ................ 356/326 |
| 5,276,543 A | * | 1/1994 | Olshansky ................ 398/79 |
| 5,444,528 A | * | 8/1995 | Puschell ................ 356/73 |
| 5,452,314 A | * | 9/1995 | Aronson ................ 372/20 |
| 5,768,010 A | * | 6/1998 | Iwamoto ................ 359/311 |
| 5,915,052 A | * | 6/1999 | Ball ................ 385/24 |
| 6,151,157 A | * | 11/2000 | Ball et al. ................ 359/337.12 |
| 6,278,889 B1 | * | 8/2001 | Robinson ................ 600/322 |
| 6,341,021 B1 | * | 1/2002 | Wilner et al. ................ 398/79 |
| 6,351,323 B1 | * | 2/2002 | Onaka et al. ................ 398/84 |
| 6,366,379 B1 | * | 4/2002 | Terahara et al. ................ 398/213 |

OTHER PUBLICATIONS

Patent Abstracts of Japan of Japanese Patent Application Laid-open Publication No. Hei9-113855, May 2, 1997.
Patent Abstracts of Japan of Japanese patent Application Laid-open Publication No. Hei9-243978, Sep. 19, 1997.

* cited by examiner

*Primary Examiner*—Agustin Bello
(74) *Attorney, Agent, or Firm*—Staas & Halsey LLP

(57) ABSTRACT

The present invention relates to the selected-wavelength tuning apparatus which is provided with an AOTF, a radio-frequency signal generator, an optical detector, and a controller for detecting lights emitted from the AOTF with the optical detector and for controlling a frequency of the radio-frequency generator so as to detect a light of predetermined wavelength.

17 Claims, 22 Drawing Sheets

A  In case of one reference signal

B  In case of two reference signals

SELECTED-WAVELENGTH TUNING FILTER AND OPTICAL ADD/DROP MULTIPLEXER

BACKGROUND OF THE INVENTION

1. Field of the Invention

The present invention relates to a selected-wavelength tuning filter which is able to select an optical signal of desirable wavelength even when temperature changes or deterioration due to age occur and an optical add/drop multiplexer using the selected-wavelength tuning filter in an optical communication equipment for use in the optical communication network.

2. Description of the Related Art

Ultra-long-distance and large-capacity optical communication apparatuses are now required to construct future multimedia networks. Concentrated studies are now being made of the wavelength-division multiplexing as a method for realizing large-capacity apparatuses in view of such advantages that it can effectively utilize a wide bandwidth and a large capacity of an optical fiber.

Specifically, an optical communication network requires a function for passing, dropping and adding optical signals at each point on the network as necessary and an optical routing function and a cross-connecting function for selecting an optical transmission route. For this, researches and developments are being conducted on an optical add/drop multiplexer (hereinafter abbreviated as "OADM") for passing, dropping and adding optical signals.

The OADM includes a wavelength-fixed type OADM that is able to drop/add only optical signal(s) of fixed wavelength and an arbitrary-wavelength type OADM that is able to drop/add optical signal(s) of arbitrary wavelength(s).

On the other hand, an acousto-optic selected-wavelength tuning filter (hereinafter abbreviated as "AOTF") operates so as to extract only light of selected wavelength, so that its wavelength characteristic to an optical signal passing through the AOTF is flat. It is also able to select any wavelength, in contrast to an optical fiber grating, which is able to only select fixed wavelength. Still more, because it is a selected-wavelength tuning filter, it may be used also as a wavelength selecting filter in a tributary office, which is an office for dropping/adding optical signals between end offices.

The researches and developments have been conducted on the OADM using the AOTF from such reasons.

FIG. 20 is a block diagram showing the structure of the conventional AOTF.

In the figure, the AOTF comprises two optical waveguides 201 and 202 on a substrate of lithium niobate (LiNbO$^3$) which presents a piezoelectric effect. These optical waveguides 201 and 202 cross each other at two points and polarization beam splitters (hereinafter abbreviated as "PBS") 203 and 204 are provided at the parts where the two optical waveguides cross each other.

A SAW guide 206 made of metallic film is formed on the two optical waveguides 201 and 202 between the crossing parts. Surface acoustic wave is generated when a radio-frequency signal is applied to an inter-digital transducer (hereinafter abbreviated as "IDT") 205 propagates through the SAW guide 206.

While light entered to this AOTF is light in which TE and TM mode lights are mixed, but it is separated by the PBS 203 into the TE and TM mode lights, which propagate through the optical waveguides 201 and 202. Here, when surface acoustic wave propagates along the SAW guide 206 by a radio-frequency signal of specific frequency being applied, refractive indices of the optical waveguides 201 and 202 change periodically at the parts where the optical waveguides 201 and 202 cross with the SAW guide 206. Therefore, the TE mode and the TM mode of only light of the wavelength that interacts with the periodic change of the refractive index among the entered lights are switched. Then, the PBS 204 changes the propagating direction of the switched lights. Only light of the interacting wavelength is selected as light to be dropped and light of wavelength which has not interacted is trajected and transmitted as output light.

On the other hand, in the same manner, added light is also separated by the PBS 203 into TE and TM mode lights, propagates in the optical waveguides 201 and 202, and interacts with the surface acoustic wave. Then, only the respective modes of the light having specific wavelengths which are switched, changing propagating directions, and then added, becoming output light.

Thus, because the AOTF can select and drop only the light having the wavelength corresponding to the frequency of the radio-frequency signal and can change wavelength of light to be selected by changing the frequency of the radio-frequency signal, it functions as a selected-wavelength tuning filter.

It is noted that in the present specification, the main part which is formed on the substrate of lithium niobate (LiNbO$^3$) and where light is dropped/added (passed) shown in FIG. 20 will be called an AOTF or an AOTF section, and the whole device plus peripheral devices for dropping/ adding (passing) light will be called a selected-wavelength tuning filter.

Further, because the AOTF can drop/add light of any wavelength, it may be used for the OADM. The applicant of the present invention has already filed the invention in which the AOTF is used for the OADM as Japanese Patent Application No. 090383/1998.

Next, the OADM described in Japanese Patent Application No. 090383/1998 which is not yet laid open will be explained.

FIG. 21 is a block diagram showing the first basic structure of the OADM using the AOTF as shown in FIG. 20. The OADM shown in FIG. 21 can drop and receive optical signals of eight wavelengths and can generate and add optical signals of eight wavelengths. Here, because the respective structures for receiving and processing the optical signals are the same, only one structure is shown and the others are omitted in the figure. The respective structures for generating the optical signals are also the same, so that only one structure is shown and the others are omitted in the figure.

In FIG. 21, a WDM optical signal is entered to the AOTF section 210 and an optical signal having a wavelength corresponding to the frequency of the radio-frequency signal applied to the AOTF section 210 is dropped as a branched optical signal from a branching port of the AOTF section 210. This branched optical signal is amplified by an optical amplifier 217 for amplifying light and is then entered to a 1×8 optical coupler 218. The branched optical signal is divided and branched into eight lights by the 1×8 optical coupler 218 and is entered to an AOTF section 219. Accordingly, the optical signals of all wavelengths branched by the AOTF section 210 are contained in each of the divided and branched optical signals. Therefore, the AOTF section 219 selects only the optical signal of a wavelength to be received and processed by an optical receiver 220, and then the optical receiver 220 receives and processes it.

On the other hand, an optical signal to be added is generated as follows.

A laser diode (hereinafter abbreviated as "LD") 211, i.e., a light source, emits laser beams having wavelengths corresponding to the wavelengths of the optical signals to be added. LDs 211 are prepared in the number of optical signals to be added, and in the case in FIG. 21, there are eight. The laser beams from the eight LDs are entered to an 8×8 optical coupler 212. The 8×8 optical coupler 212 wavelength-multiplexes the lights of eight wavelengths and branches the wavelength-multiplexed light by dividing them into eight. The branched light is amplified by an optical amplifier 213 and then entered to an AOTF section 214. The AOTF section 214 selects and exits a light having a wavelength to be used for an addition optical signal among lights in which lights of eight wavelengths are multiplexed. The light selected by the AOTF section 214 is modulated by an optical modulator 215 and entered to an 8×1 optical multiplexer 216 as an optical signal. The 8×1 optical multiplexer 216 multiplexes the optical signals of the respective wavelengths to generate an addition optical signal. The generated addition optical signal is added to an adding port of the AOTF section 210.

Because the AOTF section 210 not only branches the optical signal of the desirable wavelength but also adds the optical signal having the same wavelength with the branched wavelength as described above, the added optical signal is added by the AOTF section 210, and is exited as a WDM optical signal from an output port of the AOTF section 210 together with the WDM optical signal which is not branched and passes through as it is.

Thus, the AOTF may be used for the part for passing, dropping and adding the WDM optical signal, the part for generating the addition optical signal and the part for receiving and processing the drop optical signal of the OADM.

FIG. 22 is a block diagram showing the second basic structure of the OADM using the AOTF sections shown in FIG. 20. The figure shows the OADM that can drop and receive optical signals of eight wavelengths and can generate and add optical signals of eight wavelengths. Here, the respective structures for receiving and processing the optical signal are the same, so that only one structure is shown and the other remaining structures are omitted in the figure. The respective structures for generating the optical signal are also the same, so that only one structure is shown and the other remaining structures are omitted in the figure. Still more, the same components with those in FIG. 21 are denoted by the same reference numerals and the explanation thereof will be omitted here.

In FIG. 22, a WDM optical signal is entered to an optical coupler 230 and branched into two signals. One branched WDM optical signal is entered to an AOTF section 231 and the other is entered to an optical amplifier 217. The other WDM optical signal is amplified by the optical amplifier 217 and entered to the 1×8 optical coupler 218. It is divided and branched into eight signals by the 1×8 optical coupler 218 and is entered to an AOTF section 219. The AOTF section 219 selects only an optical signal having a wavelength to be received and processed by the optical receiver 220 and then the optical receiver 220 receives and processes it.

On the other hand, the WDM optical signal entered to the AOTF section 231 selects an optical signal which is the same with that of the AOTF section 219 in the receiving processing part and selects an optical signal of an even (odd) number of channel of the WDM optical signal and exits it to a selection port which is not connected anywhere. Which means, the optical signal of the wavelength selected by the AOTF section 231 is abandoned. The WDM optical signal, which has passed through the AOTF section 231, is entered to an AOTF section 232. The AOTF section 232 also selects an optical signal which is the same with that of the AOTF section 219 in the receiving process and an optical signal of an odd (even) number of channel of the WDM optical signal and exits it to a selection port not connected anywhere. Then, the WDM optical signal, which has passed through the AOTF section 232, is entered to an optical coupler 233.

Here, the AOTF sections 231 and 232 are connected in tandem because the range of the wavelength selecting characteristic of the AOTF is wide and crosstalk occurs when neighboring optical signals having a wavelength at intervals of 0.8 nm prescribed in ITU-T G. Recommendation 692 are to be branched by one AOTF. For this reason, the crosstalk could be reduced to a level where the optical signal is receivable by making the WDM signal select the even (odd) numbered optical signals of the WDM optical signals in the first stage of the AOTF section 231 and by making the WDM signal select the even (odd) numbered optical signals of the WDM optical signals in the second stage of the AOTF section 232.

The optical signal to be added is generated in the same manner with the case shown in FIG. 21, so that the explanation thereof will be omitted here. The generated optical signal to be added is entered to an optical coupler 233, is multiplexed with the WDM optical signal which has passed through the AOTF sections 231 and 232 and is exited to the optical transmission line as a WDM optical signal.

Thus, the AOTFs are used for the part for passing, dropping and adding the WDM optical signal, the part for generating the optical signal to be added and the part for receiving and processing the branched optical signal in the OADM.

By the way, although the AOTF can select and drop only light having the wavelength corresponding to the frequency of the radio-frequency signal as described above, its temperature dependency with respect to selected wavelength is high. More specifically, when temperature rises by 1° C. when the radio-frequency signals of the same frequency are applied, the selected wavelength changes by 0.8 nm (100 GHz).

Therefore, in the OADM using the AOTFs, an optical signal of the next wavelength is selected instead of an optical signal of the wavelength to be selected in the WDM optical signal in which wavelengths are disposed at intervals of 0.8 nm. Moreover, because it is difficult to control the AOTFs used in the OADM all to the same temperature, it is difficult to select optical signals of the same wavelength even when radio-frequency signals of the same frequency are applied to all AOTFs to select the same wavelength.

Further, the wavelength selected by the radio-frequency signal is also sensitive to variation of devices in the production of the AOTFs and to deterioration due to age.

Because the selection of the wavelength by the AOTFs is controlled by separating a light into the TE and TM mode lights and by causing them to interact with the surface acoustic wave as described above, the wavelength to be selected is changed when the state of polarized wave changes.

The intensity of light to be selected of the AOTF also changes depending on input intensity of the radio-frequency signal to be applied. It means that the intensity of light exited to the selection port by the AOTF changes in the OADM as shown in FIG. 22. In case when the input intensity of the radio-frequency signal is not appropriate, it is difficult to fully reject an optical signal to be rejected by the AOTF when rejecting it by exiting to the selection port because not enough optical signals are selected to the selection port.

SUMMARY OF THE INVENTION

A primary object of the present invention is to provide a selected-wavelength tuning filter which is suitably used as an AOTF and which can select an optical signal of a predetermined wavelength even if temperature changes or deterioration due to age occur.

The second object of the present invention is to provide a selected-wavelength tuning filter which is suitably used as an AOTF and which can fully reject an optical signal of a predetermined wavelength even if temperature changes or deterioration due to age occur.

The third object of the present invention is to provide an OADM which can drop/add optical signal(s) of predetermined wavelength(s) even if temperature changes or deterioration due to age occur.

The fourth object of the present invention is to provide an optical spectrum analyzer which is utilized in the OADM and the like by utilizing the selected-wavelength tuning filter of the present invention.

The fifth object of the present invention is to provide an OADM that has a function of the optical spectrum analyzer by utilizing the selected-wavelength tuning filter of the present invention.

The above-described objects may be achieved by controlling the frequency of a radio-frequency signal so that a light of a predetermined wavelength can be detected from the light exited from the AOTF.

The optical signal of the wavelength-division multiplexed optical signals, the reference signal to which the optical signal is newly added, and the mark which is made to ASE by AOTF will be used as the light of the predetermined wavelength, for example. Besides, as for detecting light of a predetermined wavelength, for example, a light intensity detector and an optical spectrum analyzer will be used.

And, when the frequency of the radio-frequency signal to select the light of the predetermined wavelength is discriminated, the frequency of the radio-frequency signal to select the light of wavelength other than the predetermined wavelength also can be discriminated, since the relationship between the frequency of the radio-frequency signal and the selected wavelength of AOTF can be shown by linear function.

As an example, the selected-wavelength tuning filter can be configured by comprising AOTF for branching light into selected-wavelength light and light with other wavelengths in accordance with the radio-frequency signal, the radio-frequency signal generating section for generating the radio-frequency signal, the light intensity detecting section for detecting the intensity of the light from AOTF, the radio-frequency signal controlling section for controlling the radio-frequency signal generating section so as to select light of a predetermined wavelength in accordance with the output of the light intensity detecting section.

Furthermore, for example, the selected-wavelength tuning filter can stably select light of a predetermined wavelength by superimposing low frequency to the radio-frequency signal.

Besides, since the selected-wavelength tuning filter described above can detect the frequency of the radio-frequency signal and the intensity of the light selected by AOTF, it can be used in an optical spectrum analyzer, for example, by comprising the storage section for storing the light intensity and the frequency of the radio-frequency signal and the output section.

In addition, the selected-wavelength tuning filter described above can also be used in OADM for adding and dropping the optical signal from the wavelength-division multiplexed optical signals.

It is noted that the further objects and characteristics of the present invention will be clearly shown in the following explanation described based on the accompanying drawings.

DESCRIPTION OF THE PREFERRED EMBODIMENTS

The first embodiment will be explained at first.

Figure 1:
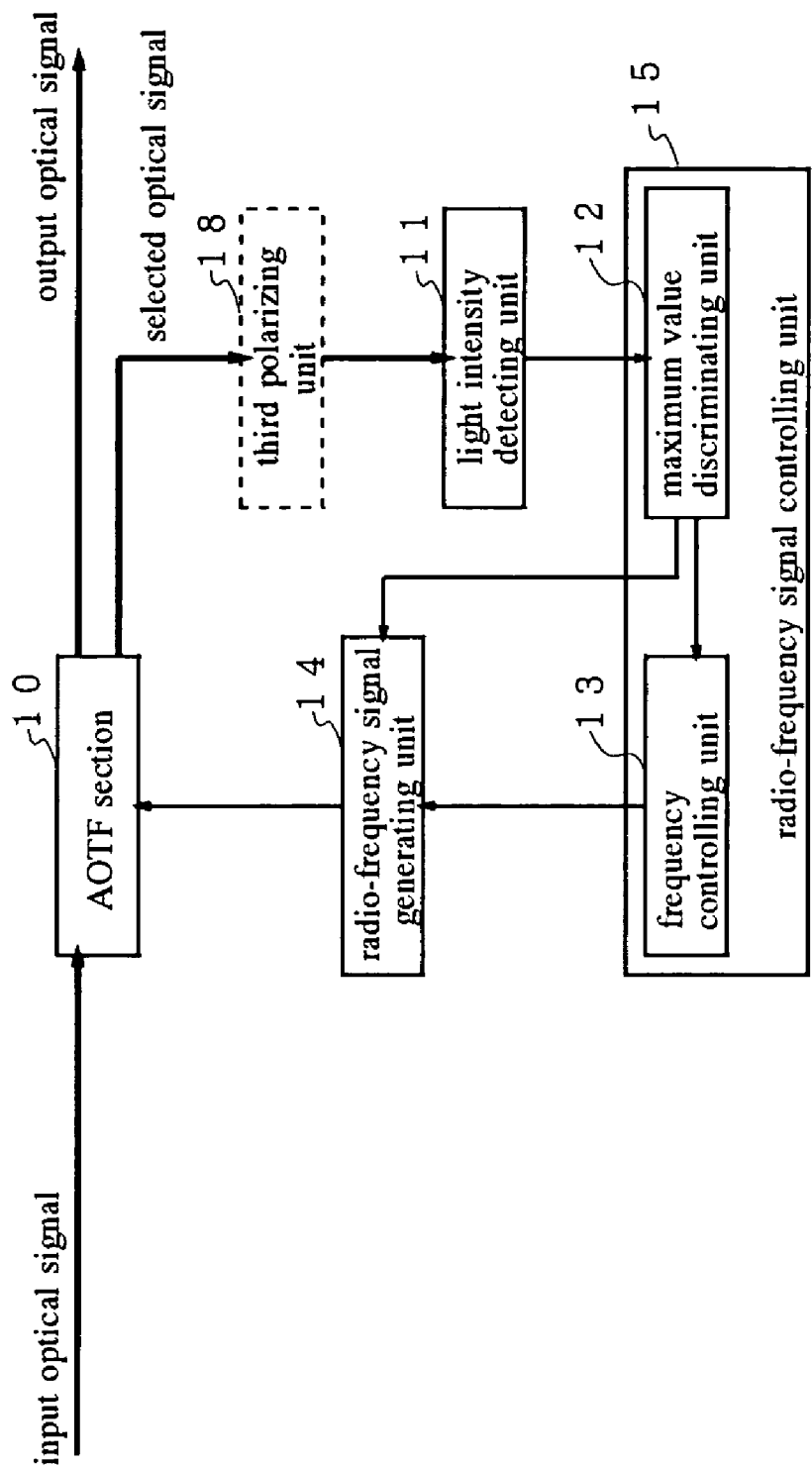
FIG. 1 is a block diagram showing a structure of the first embodiment.

In FIG. 1, the present selected-wavelength tuning filter comprises an AOTF section 10, light intensity detecting unit 11, radio-frequency signal controlling unit 15, and radio-frequency signal generating unit 14. Here, third polarizing unit 18 indicated by broken lines and located between the AOTF section 10 and the light intensity detecting unit 11 is a component which is used in the case of discriminating the maximum value of the light intensity with the intensity of TM mode light and the intensity of TE mode light.

An input optical signal is entered to the AOTF section 10 which can drop/add optical signal(s) of specific wavelength(s) corresponding to frequency of a radio-frequency signal to be applied. Specifically, in the selected-wavelength tuning filter according to claims 1, 2 and 3, the AOTF section 10 comprises first polarizing unit for multiplexing the received optical signal with an optical signal to be added and for branching an optical input into TM and TE mode lights; radio-frequency signal applying unit for applying radio-frequency signal(s) to the first optical waveguide for propagating the branched TM mode light and the second optical waveguide for propagating the branched TE mode light; and second polarizing unit for multiplexing optical signals from the first and second optical waveguides to which the radio-frequency signal(s) has/have been applied, and for branching them into the optical signal of the wavelength corresponding to the radio-frequency signal and to optical signals of other wavelengths.

The radio-frequency signal applied to the first and second optical waveguides is generated by the radio-frequency signal generating unit 14 whose frequency is controlled by the radio-frequency signal controlling unit 15.

The optical signal selected by the AOTF section 10 is entered to the light intensity detecting unit 11 which detects its light intensity. The output of the light intensity detecting unit 11 is inputted to the radio-frequency signal controlling unit 15. On the other hand, the optical signal not selected by the AOTF section 10 is exited to the optical transmission line as an exited optical signal from the AOTF section 10.

The radio-frequency signal controlling unit 15 controls the radio-frequency signal generating unit 14 so as to select the optical signal of the predetermined wavelength based on the output of the light intensity detecting unit 11.

For example, the radio-frequency signal controlling unit 15 may be constructed with the maximum value discriminating unit 12 and the frequency controlling unit 13.

The maximum value discriminating unit 12 discriminates the maximum value of the light intensity with respect to an optical signal of a predetermined wavelength by receiving the light intensity from the light intensity detecting unit 11 while changing the frequency of the radio-frequency signal and outputs the frequency of the radio-frequency signal which sets the light intensity at this maximum value to the frequency controlling unit 13. While the optical signal of the predetermined wavelength may be discriminated readily when there is only one wave within the optical transmission line, but in the case of a WDM optical signal, it is discriminated in correspondence to the number of maximum values greater than a certain threshold value and the number of channels (hereinafter abbreviated as "ch") of the optical signal of the predetermined wavelength. For instance, when the optical signal of the predetermined wavelength is ch 3, the third maximum value is the maximum value of the optical signal of the predetermined wavelength.

The frequency controlling unit 13 controls the radio-frequency signal generating unit 14 so that it generates the radio-frequency signal of the frequency which sets the maximum light intensity to the optical signal of the predetermined wavelength.

In the selected-wavelength tuning filter constructed as described above, the frequency of the radio-frequency signal is controlled by the radio-frequency signal controlling unit 15 so as to be the predetermined wavelength. Therefore, the selected-wavelength tuning filter can always drop/add the optical signal(s) of the specific wavelength even if the frequency of the radio-frequency signal for dropping/adding the specific wavelength is shifted due to temperature change, etc. because it can compensate for such shift.

It is noted that the specific wavelength of the optical signal selected by the selected-wavelength tuning filter may be the same or different with/from the predetermined wavelength of the optical signal for finding the frequency of the adequate radio-frequency signal for that. It is because the frequency of the radio-frequency signal for selecting the specific wavelength may be found when the frequency of the radio-frequency signal for selecting the predetermined wavelength is found because the relationship between the frequency of the radio-frequency signal and the selected wavelength is always constant even when temperature changes as described later. In this case, the radio-frequency signal controlling unit 15 correlates the frequency of the radio-frequency signal for selecting the predetermined wavelength with the frequency of the radio-frequency signal for selecting the specific wavelength.

Besides, in the selected-wavelength tuning filter described above, the frequency controlling unit 13 generates the frequency smaller than the frequency of the radio-frequency signal supplied by the radio-frequency signal generating unit 14, and the radio-frequency signal generating unit 15 may superimpose the frequency generated by the frequency controlling unit 13 to the radio-frequency signal.

Thus, the maximum value discriminating unit 12 searches for the maximum value of the predetermined wavelength roughly at first by changing the frequency of the radio-frequency signal at wide pitches. After that, it searches for the maximum value of the predetermined wavelength accurately by changing the frequency of the radio-frequency signal at narrow pitches within the range in the vicinity of the frequency of the radio-frequency signal which sets the intensity at its maximum value. Therefore, since the selected-wavelength tuning filter described above can discriminate the maximum value more quickly and more accurately as compared to the selected-wavelength tuning filter according to claim 1, it can select the optical signal of the specific wavelength more quickly and accurately.

The selected-wavelength tuning filter described above is characterized in that the frequency controlling unit 13 may control the frequency of the radio-frequency signal so that the light intensity of the optical signal of the specific wavelength is maximized every time the optical signal of the specific wavelength is changed.

The optical signal of the specific wavelength can be selected accurately even if the frequency of the radio-frequency signal for selecting the specific wavelength is shifted by temperature changes or the like because the frequency of the radio-frequency signal for selecting the optical signal of the specific wavelength are searched every time the optical signal of the specific wavelength is selected as described above.

In general, the AOTF selects light of specific wavelength by having light separate into TE and TM mode lights, propagating in the optical waveguides separately, causing interactions with the surface acoustic wave, and having each mode of the specific wavelength switched, as explained in the section of the related art. At this time, the optimum frequency of the radio-frequency signal for switching the TE mode to the TM mode is different from the optimum frequency of the radio-frequency signal for switching the TM mode to the TE mode.

For that, in the selected-wavelength tuning filter described above, the radio-frequency signal of the AOTF section 10 may be applied by the first radio-frequency signal applying unit for applying the first radio-frequency signal to the first optical waveguide and second radio-frequency signal applying unit for applying the second radio-frequency signal to the second optical waveguide. Corresponding to that, the radio-frequency signal generating unit 14 is configured so as to supply radio-frequency signals of different frequencies to the first and second radio-frequency signal applying unit.

The frequency of the radio-frequency signal can be changed separately for each mode in the maximum value discriminating unit 12 and the radio-frequency signal of different frequencies can be applied to each mode based on the result by configuring the selected-wavelength tuning filter as described above, therefore, the optical signal of the specific wavelength can be selected more accurately.

Further, the selected-wavelength tuning filter comprising the first and second radio-frequency signal applying unit is characterized in that the third polarizing unit 18 may be provided between the AOTF section 10 and the light intensity detecting unit 11. The third polarizing unit 18 branches the optical signals selected and exited from the AOTF section 10 into TM and TE modes and exits them to the light intensity detecting unit 11. Corresponding to that, the light intensity detecting unit 11 is composed of two light intensity detecting unit, which is the first light intensity detecting unit for detecting light intensity of the TM mode light exited from the third polarizing unit 18 and the second light intensity detecting unit for detecting light intensity of the TE mode light exited from the third polarizing unit 18.

Such configuration allows the frequency of the radio-frequency signal optimal to the TE mode and the frequency of the radio-frequency signal optimal to the TM mode to be searched for independently because the individual light intensity detecting unit 11 is provided for each mode of the TM mode and TE mode. Therefore, the selected-wavelength tuning filter according to claim 10 can select the optical signal of the specific wavelength accurately.

On the other hand, although the selected-wavelength tuning filter provided with the third polarizing unit 18 is effective when polarized light is rotating slowly, when the polarized light is rotating faster than the time for finding the optimum frequency of the radio-frequency signal, searching for the optimum frequency of the radio-frequency signal by separating the TE and TM modes to detect each light intensity as described above, it is unable to follow the rotation of the polarized light. In such a case, the selected-wavelength tuning filter whose configuration is that the light intensity detecting unit 11 directly receives the light emitted from the AOTF section 10 is advantageous.

Here, when there is an optical signal to be added in the selected-wavelength tuning filter, the add optical signal is also entered to the AOTF section 10 and is exited to the optical transmission line as an exited optical signal by having the interaction with the surface acoustic wave caused by the radio-frequency signal in the AOTF section 10.

Besides, in the selected-wavelength tuning filter described above, a plurality of the AOTF sections 10 are formed on the same substrate. And temperature controlling unit for controlling the temperature of the plurality of the selected-wavelength tuning filters to be the same may be further provided.

While the AOTFs used in the OADM conventionally control temperatures individually, it is difficult to control all of the AOTFs to the same temperature in units of 0.1° C. It is also difficult to control the temperature of the AOTF accurately in a wide temperature range, e.g., from 0° C. to 60° C., in order to guarantee the operation of the OADM. However, it is possible to control the neighboring AOTFs substantially at the same temperature and to keep the characteristics of the AOTFs substantially the same by forming the AOTFs on one and same substrate. Therefore, it is possible to drop/add optical signal(s) of desirable wavelength(s) even by the other AOTFs if the other AOTFs are operated after first making it so as to be able to drop/add the optical signal(s) of the desirable wavelength(s) by any one of the AOTF sections 10.

Further, no optical signals having erroneous wavelengths would be selected if the output of any one of the AOTF sections 10 is not connected to the optical transmission line of the optical communication network and is used solely for confirming whether or not the optical signal of the desirable wavelength can be selected, using the other AOTFs for actual operations.

Besides, the selected-wavelength tuning filter described above may be constructed by comprising a plurality of the radio-frequency signal generating unit 14. Particularly, having a larger number of radio-frequency signal generating units than the number of the optical signals to be added and dropped is preferable, in particular, in the case of the optical add/drop multiplexer provided with the selected-wavelength tuning filter.

A plurality of radio-frequency signals corresponding to the number of optical signals dropped/added to the selected-wavelength tuning filter are applied in dropping/adding optical signals of a plurality of wavelengths in the OADM. Because there is no unused radio-frequency signal generating unit in dropping/adding another ch from a certain ch when the number of the radio-frequency signal generating unit 14 is equal to the number of optical signals to be dropped/added, the radio-frequency signal generating unit used for dropping/adding the certain ch must be used for dropping/adding the other ch. Therefore, because the frequency of the radio-frequency signal must be changed continuously to drop/add the other ch from one ch, ch between them are affected, in that they are also dropped/added. However, in dropping/adding the other ch from the certain ch, the frequency of the unused radio-frequency signal generating unit may be applied to the selected-wavelength tuning filter after adjusting it to the frequency for dropping/adding the other ch by providing one more radio-frequency signal generating unit than the number of the same to be dropped/added in the OADM. Therefore, it will not affect the ch therebetween.

Besides, in the selected-wavelength tuning filter described above, a plurality of the AOTF sections 10 may be connected in tandem.

Even when the optical signal of the specific wavelength cannot be rejected up to a predetermined light intensity level by the AOTF section 10 of one selected-wavelength tuning filter, such selected-wavelength tuning filters allow the rejection characteristic to be improved so as to be able to reject up to the predetermined level by connecting the plurality of selected-wavelength tuning filters in tandem.

Further, as described before, crosstalk occurs when the range of the wavelength selecting characteristic of the AOTF section 10 of the selected-wavelength tuning filter is wide and a single AOTF attempts to branch the neighboring optical signals having the wavelength at intervals of 0.8 nm prescribed in ITU-T G.692 Recommendation. However, because the plurality of selected-wavelength tuning filters are connected in tandem in the OADM described above, the crosstalk can be reduced by dropping/adding the number k of optical signals of the WDM optical signal in the selected-wavelength tuning filter of the first stage, by dropping/adding the number m of optical signals of the WDM optical signal separated from the number k of optical signals in the selected-wavelength tuning filter of the second stage, and, in the same manner, by causing the selected-wavelength tuning filter(s) of the later stage(s) to drop/add the optical signal(s) of the wavelength separated from the optical signal(s) dropped/added in the selected-wavelength tuning filter(s) of the previous stage(s).

For instance, when two selected-wavelength tuning filters are connected in tandem, it is possible to reduce crosstalks by causing the selected-wavelength tuning filter of the first stage to drop/add the even (odd) numbered optical signal(s) of the WDM optical signal and by causing the selected-wavelength tuning filter of the second stage to drop/add the odd (even) numbered optical signal(s) of the WDM optical signal.

Figure 2:
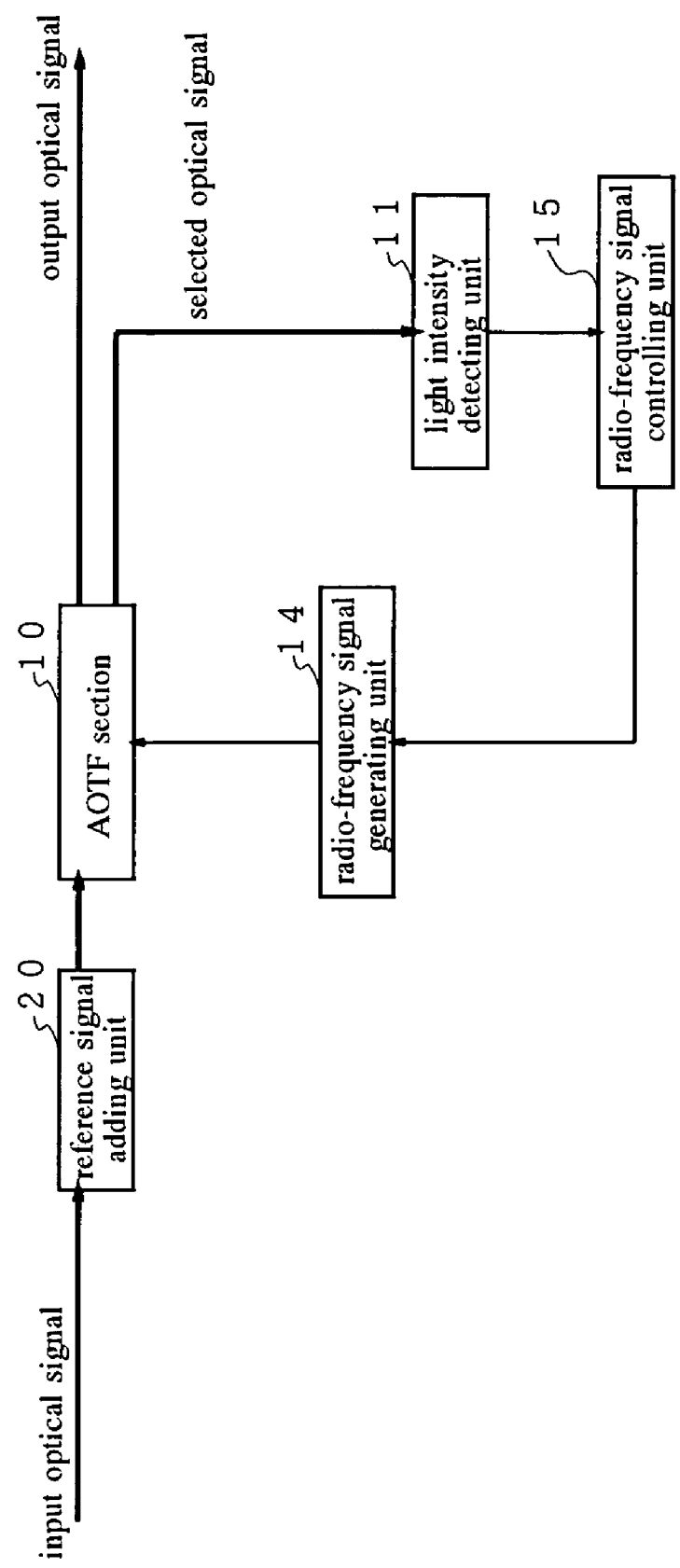
FIG. 2 is a graph showing a structure of the second embodiment.

Next, the second embodiment will be explained based on FIGS. 2 through 4.

Figure 3:
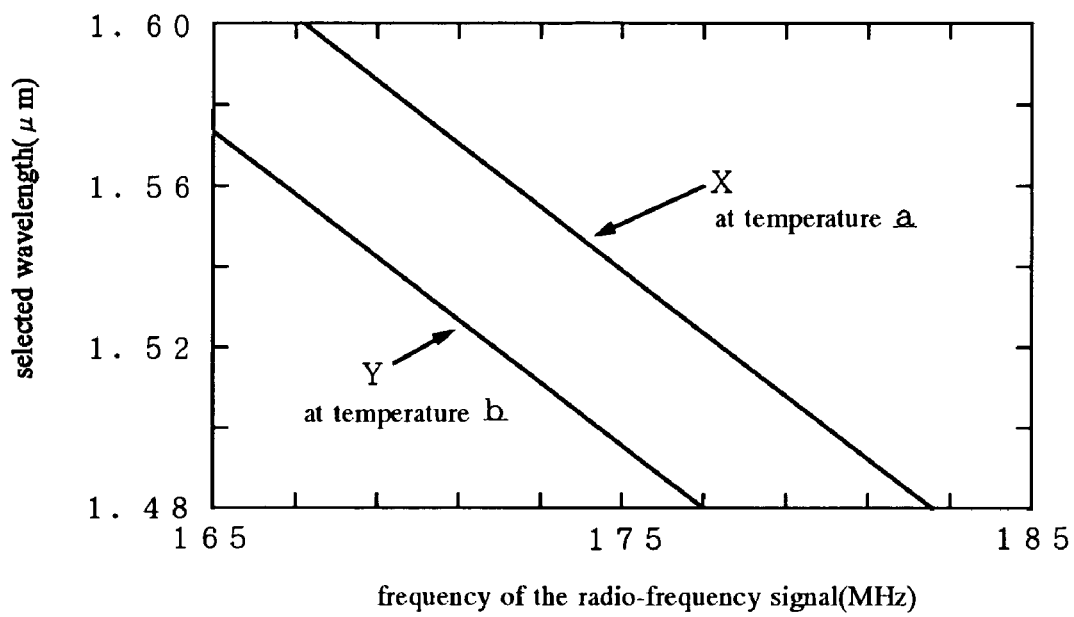
FIG. 3 is a block diagram showing the relationship between the frequency of the radio-frequency signal and the selected wavelength with respect to temperature change.
Figure 4:
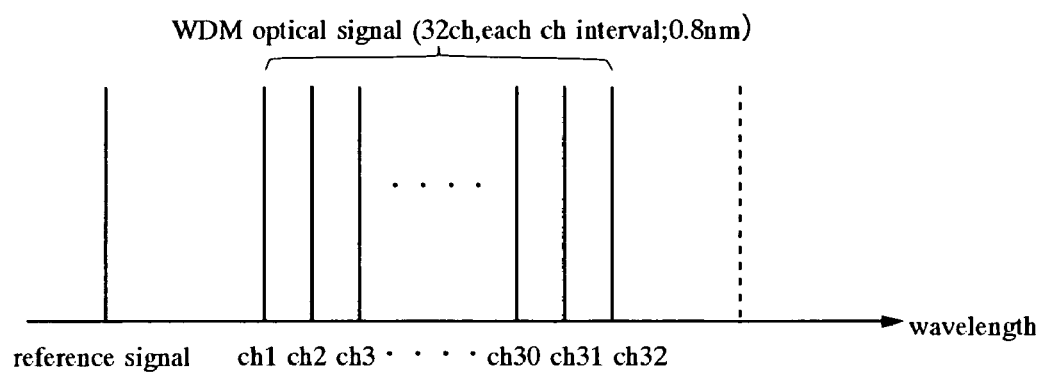
FIG. 4 is a schematic illustration showing the relationship between a reference signal and a WDM optical signal.
Figure 4:
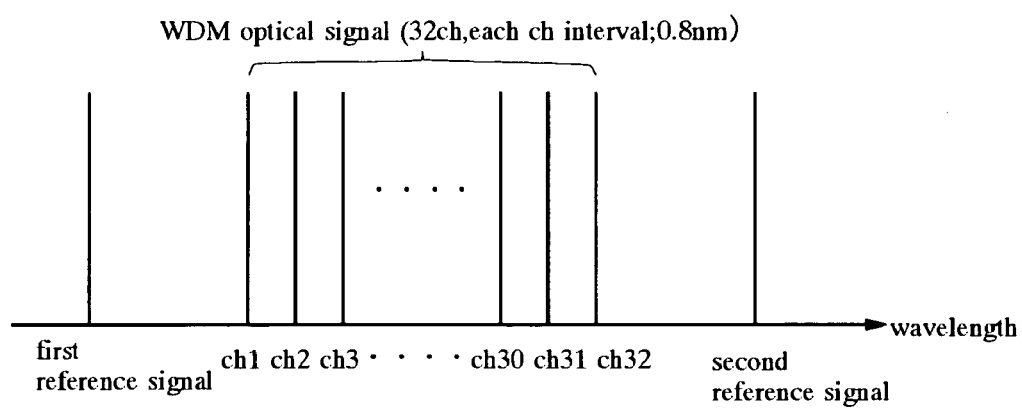

The ordinate in FIG. 3 indicates a selected wavelength indicated in unit of μm and selected by the AOTF and the abscissa indicates the frequency of the radio-frequency signal indicated in unit of MHz and to be applied to the AOTF. And FIG. 4A shows a case when there is one reference signal and FIG. 4B shows a case when there are two reference signals.

The selected-wavelength tuning filter comprises reference signal adding unit 20, the AOTF section 10, the light intensity detecting unit 11, the radio-frequency signal controlling unit 15, and the radio-frequency generating unit 14.

The radio-frequency signal adding unit 20 adds a reference signal whose wavelength is known to the optical input side of the AOTF section 10.

In case when a light to be inputted into the AOTF section 10 is an optical signal, it is preferable to set the reference signal at a wavelength in which the wavelength of the optical signal is not included.

Furthermore, one reference signal is disposed at a wavelength on the outside of channel (hereinafter abbreviated as "ch") 1 at the position away from a signal wavelength band of the 32 waves of a WDM optical signal as shown in FIG. 4A. Of course, it is also possible to dispose one reference signal at a wavelength on the outside of ch 32 as indicated by broken lines instead of disposing it at the wavelength on the outside of ch 1.

And, it is possible to dispose two reference signals at the position separated from the signal wavelength band of the 32 waves of a WDM optical signal and at a wavelength on the outside of ch 1 (first reference signal) and at a wavelength on the outside of ch 32 (second reference signal) as shown in FIG. 4B.

Besides, it is better to dispose the wavelength of the reference signal(s) at the edge of the wavelength band for transmitting the optical signal.

In the optical communication network, there are a S+ band (1,450 to 1,490 nm), a S band (1,490 to 1,530 nm), a M band (1,530 to 1,570 nm), a L band (1,570 to 1,610 nm) and a L+ bands (1,610 to 1,650 nm) corresponding to the wavelength band for transmitting optical signals. While optical amplifiers for amplifying optical signals are used corresponding to each of these bands, the gain characteristic the optical amplifiers have is not something that is flat throughout each of the bands but something that sharply decreases around the boundary of each band. Therefore, because no optical signals are disposed in the wavelength around the boundary of each band, it is possible to keep the reference signal only in the selected-wavelength tuning filter using the reference signal and not to affect the other selected-wavelength tuning filters by disposing the reference signal around the boundary. Especially because the reference signal is not amplified by relay optical amplifiers disposed in optical transmission lines of the optical communication network, it is possible to keep the reference signal only in the OADM using the selected-wavelength tuning filter and not to be output to the optical communication network.

An input optical light is entered to the AOTF section 10 that can select optical signal(s) of specific wavelength(s) corresponding to the frequency of radio-frequency signal(s) being applied. The radio-frequency signal applied to the first and second optical waveguides of the AOTF section 10 is generated by the radio-frequency signal generating unit 14 whose frequency is controlled by the radio-frequency signal controlling unit 15.

Besides, an optical signal branched by the AOTF section 10 is received by the light intensity detecting unit 11. And the radio-frequency signal controlling unit 15 detects a reference signal from the outputs of the light intensity detecting unit and computes the relationship between the selected wavelength of the AOTF section 10 and the frequency of the radio-frequency.

For example, the radio-frequency signal controlling unit 15 detects a reference signal by detecting the maximum value of the output from the light intensity detecting unit while changing the frequency of the radio-frequency signal generated by the radio-frequency signal generating unit 14. The radio-frequency signal controlling unit 15 may compute the relationship between the light of the wavelength selected by the AOTF section 10 and the frequency of the radio-frequency signal.

On the other hand, the light not branched by the AOTF section is transmitted by the AOTF section 10 to the optical transmission line as an output light.

Hereinafter, the nature of the AOTF will be explained.

In FIG. 3, a straight line X is a graph showing the relationship between the frequency of the radio-frequency signal and the selected wavelength at temperature a and a straight line Y is a graph showing the relationship between the frequency of the radio-frequency signal and the selected wavelength at temperature b.

Thus, when the frequency of the radio-frequency signal is the same, the selected wavelength of the AOTF also changes when the temperature changes. The selected wavelength shifts by 0.8 nm per 1° C. of temperature change as described above.

However, the inclination of the straight lines X and Y is constant with respect to the temperature change as shown in FIG. 3. That is, the changing of the selected wavelength with respect to the changing of the frequency of the unit radio-frequency signal is constant with respect to the temperature change.

Therefore, in selecting the specific wavelength the temperature change can be compensated by utilizing the physical phenomenon. That is, the frequency of the radio-frequency signal for selecting an arbitrary wavelength at that temperature may be found, because when any one point of the relationship between the frequency of the radio-frequency signal and the selected wavelength is decided in finding the temperature in selecting the specific wavelength, a straight line may be drawn due to the relationship between the frequency of the radio-frequency signal and the selected wavelength being linear and its inclination being constant with respect to the temperature change. Accordingly, it is possible to find the frequency of the radio-frequency signal for selecting the specific wavelength.

In case when there is one reference signal as shown in FIG. 4A, the computing method of the radio-frequency signal controlling unit is implemented by storing values of changing the selected wavelength with respect to changing frequency of a unit radio-frequency signal and by computing the relationship between the frequency of the radio-frequency signal and the selected wavelength from the value of the inclination and a value of one set of frequency of discriminated radio-frequency signal and the wavelength of the reference signal. Then, it enables the frequency of the radio-frequency signal for selecting each ch to be also computed because the difference between the wavelength of the reference signal and that of ch 1 and the difference between the wavelengths among each ch can be found.

In case when there are two reference signals as shown in FIG. 4B, the relationship between the frequency of the radio-frequency signal and the selected wavelength is computed from the frequency of two sets of discriminated radio-frequency signals and the value of the wavelength of the reference signal. Then, the frequency of the radio-frequency signal for selecting each ch may be also computed because the difference between the wavelength of the first reference signal and the wavelength of ch 1 and the difference between the wavelength of the second reference signal and the wavelength of ch 32 may be found.

Because the selected-wavelength tuning filter can discriminate the relationship between the frequency of the radio-frequency signal and the selected wavelength at certain temperature, it can select the optical signal of the specific wavelength even when the frequency of the radio-frequency signal for dropping/adding the specific wavelength is shifted.

Next, the third embodiment will be explained.

Figure 5:
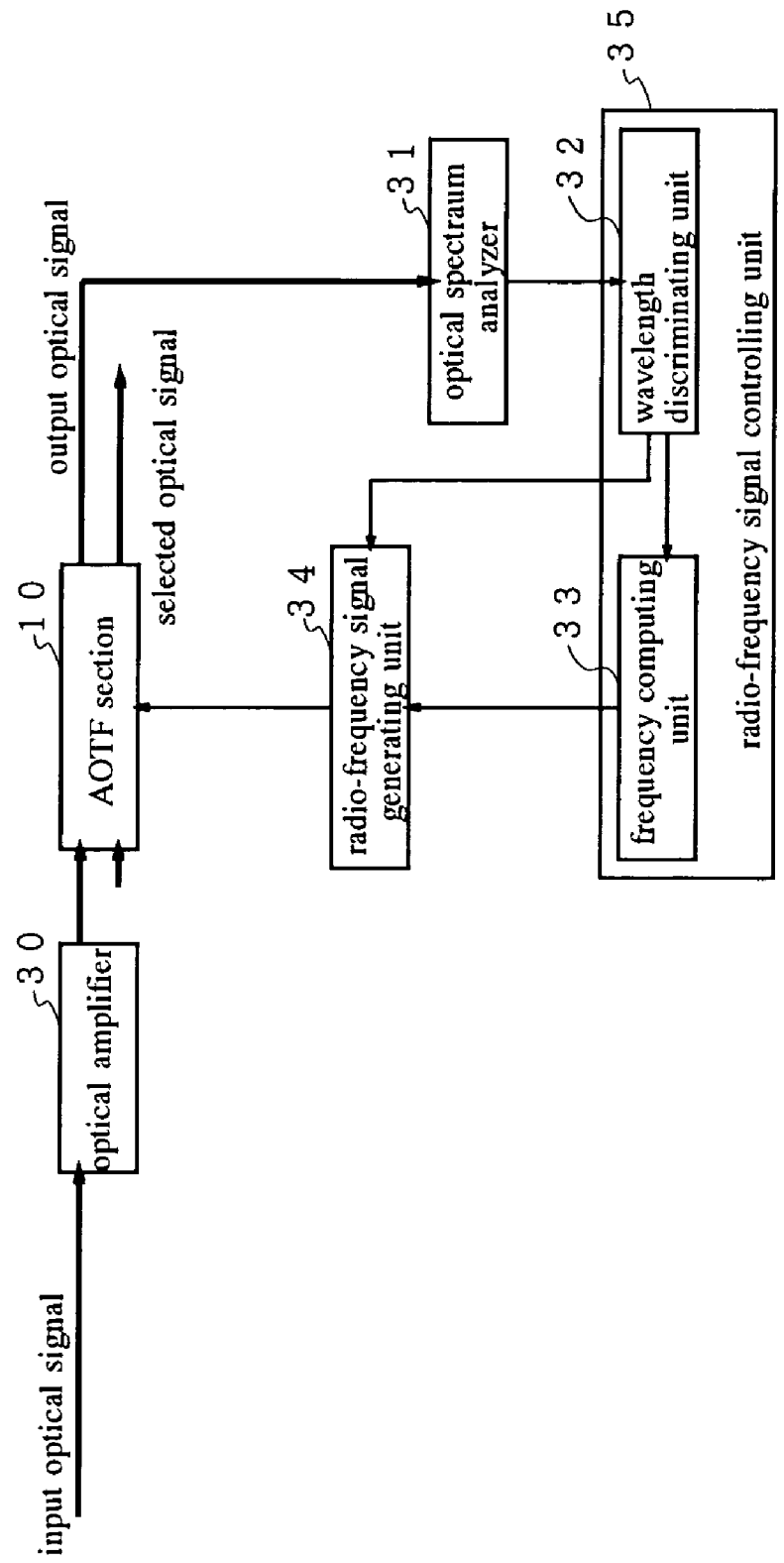
FIG. 5 is a block diagram showing a structure of the third embodiment.
Figure 6:
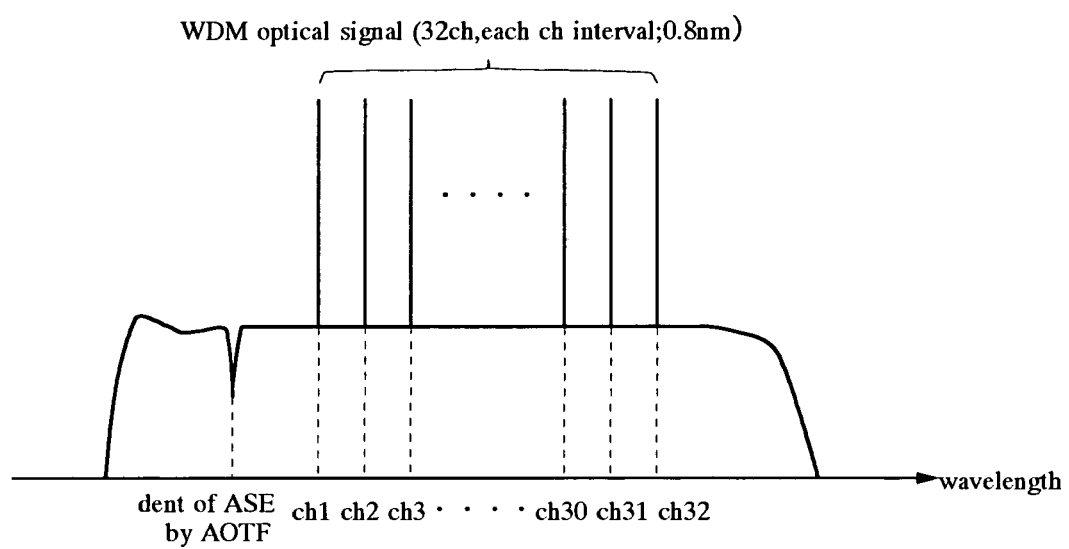
FIG. 6 is a schematic illustration showing the relationship between a dent of ASE and the WDM optical signals.

In FIGS. 5 and 6, the selected-wavelength tuning filter comprises light amplifier 30, the AOTF section 10, optical spectrum analyzer 31, radio-frequency signal controlling unit 35, and radio-frequency signal generating unit 34. The radio-frequency signal controlling unit 35, for example, comprises wavelength discriminating unit 32 and frequency controlling unit 33.

An input optical signal is entered to the optical amplifier 30 for amplifying a wavelength band including the input optical signal. Generally, amplified spontaneous emission occurs within an amplifying medium of the optical amplifier and is amplified in the same manner with an optical signal to be amplified, thus becoming white noise. This will be called an ASE (amplified spontaneous emission). The input optical signal is an optical signal containing this ASE as shown in FIG. 6.

The input optical signal containing the ASE is entered to the AOTF section 10 which can select the optical signal of a specific wavelength corresponding to the frequency of a radio-frequency signal to be applied. The radio-frequency signal applied to the first and second optical waveguides of the AOTF section 10 is generated by the radio-frequency signal generating unit 34 whose frequency is controlled by the wavelength discriminating unit 32 and the frequency computing unit 33.

The optical signal not selected by the AOTF section 10 is entered to the optical spectrum analyzer 31 that monitors wavelengths of optical signals and light intensities in the wavelengths. Note that the case where the optical signal selected by the AOTF section 10 is entered to the optical spectrum analyzer 31 will be explained later.

The wavelength discriminating unit 32 generates the radio-frequency signal of known frequency which will not branch a wavelength of an optical signal to be transmitted but branches any one wavelength in the ASE that came from the optical amplifier and detects the wavelength of the ASE by the output from the optical spectrum analyzer 31. When the radio-frequency signal of the known frequency is applied to the AOTF section 10, the ASE having the corresponding wavelength is selected, so that the light intensity of the ASE at the selected part decreases and a dent is created as shown in FIG. 6. It is possible to discriminate one set of the relationship between the frequency of the radio-frequency signal and the selected wavelength by detecting this dent by the wavelength discriminating unit 32.

One set of the relationship between the frequency of the radio-frequency signal and the selected wavelength discriminated by the wavelength discriminating unit 32 is outputted to the frequency computing unit 33 and the frequency computing unit 33 computes the relationship between the wavelength of the optical signal selected by the selected-wavelength tuning filter and the frequency of the radio-frequency signal based on one set of values.

The computing method allows the relationship between the frequency of the radio-frequency signal and the selected wavelength to be computed by storing values of changing the selected wavelength with respect to the changing frequency of the unit radio-frequency signal and from the value of its inclination and from one set of discriminated value of the frequency of the radio-frequency signal and the wavelength of ASE.

The selected-wavelength tuning filter can select the optical signal of the specific wavelength by configuring as described above even if the frequency of the radio-frequency signal for selecting the specific wavelength is shifted due to temperature changes or the like because it can discriminate the relationship between the frequency of the radio-frequency signal and the selected wavelength at a certain temperature.

Next, the fourth embodiment will be explained.

Figure 7:
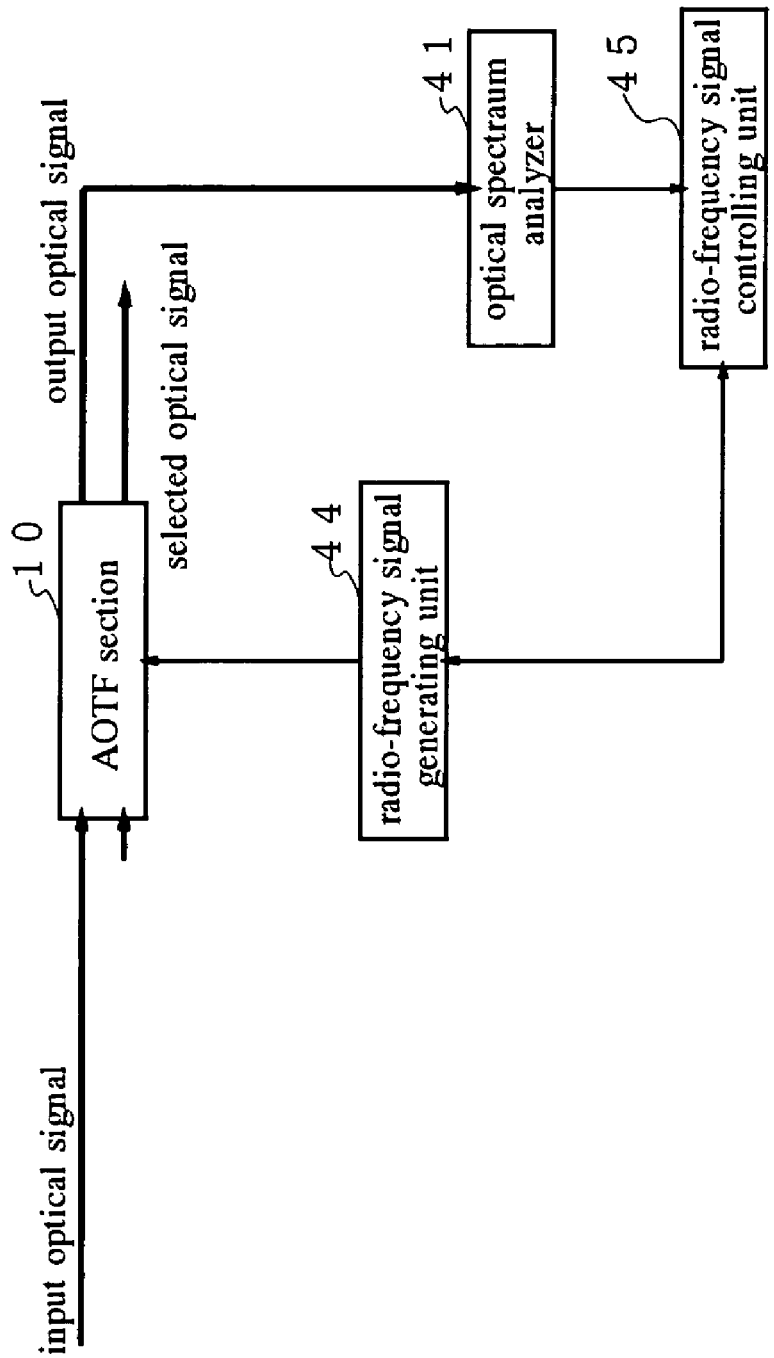
FIG. 7 is a block diagram showing a structure of the fourth embodiment.

In FIG. 7, the selected-wavelength tuning filter comprises the AOTF section 10, optical spectrum analyzer 41, radio-frequency signal controlling unit 45, and radio-frequency signal generating unit 44.

The optical input signal is entered the AOTF section 10 which can select the optical signal of the specific wavelength in accordance with the frequency of the radio-frequency signal being applied. The radio-frequency signal to be applied to the first and second optical waveguides of the AOTF section 10 is generated by the radio-frequency signal generating unit 44 whose frequency is controlled by the radio-frequency signal controlling unit 45. The radio-frequency signal generating unit 44 outputs the frequency of the radio-frequency signal being applied to the radio-frequency signal controlling unit 45.

The optical signal not selected by the AOTF section 10 is entered to the optical spectrum analyzer 41 that monitors wavelengths of the optical signals and light intensities in the wavelength.

The radio-frequency signal controlling unit 45 monitors the frequency of the radio-frequency signal applied from the radio-frequency signal generating unit 44 to the AOTF section 10 and receives the wavelength of the optical signal outputted from the optical spectrum analyzer 41 and the light intensity in the wavelength.

It is possible to discriminate which ch has been selected by the AOTF section 10 from the output of the optical spectrum analyzer 41 because the wavelength of each ch of the WDM optical signal is known. Thus, the radio-frequency signal controlling unit 45 can calculate the relationship between the wavelength of the optical signal selected by the selected-wavelength tuning filter and the frequency of the radio-frequency signal based on one set of discriminated frequency of the radio-frequency signal and the selected wavelength.

The relationship between the frequency of the radio-frequency signal and the selected wavelength is calculated by the method where it stores values of the changes in the selected wavelength with respect to the changes in the frequency of the unit radio-frequency signal and calculates based on the value of its inclination and the value of a set of a discriminated frequency of the radio-frequency signal and a wavelength of the selected wavelength.

The selected-wavelength tuning filter can select the optical signal of the specific wavelength by configuring as described above even when the frequency of the radio-frequency signal for selecting the specific wavelength is shifted due to temperature changes or the like because it can discriminate the relationship between the frequency of the radio-frequency signal and the selected wavelength at a certain temperature.

Next, the fifth embodiment will be explained.

The fifth embodiment relates to a technology for stabilizing the radio-frequency signal and its operation will be called "tracking" hereinafter. "Scanning" and "tracking" will be defined below in order to discriminate tracking from scanning described later.

"Scanning" is an operation that detects an optical signal of a predetermined wavelength by light intensity detecting unit while changing the frequency of the radio-frequency signal at the first frequency-intervals and that discriminates the first maximum value where the light intensity is maximized to discriminate the frequency of the radio-frequency signal that sets the maximum light intensity.

"Tracking" is an operation that detects an optical signal of a predetermined wavelength by the light intensity detecting unit while changing the frequency of the radio-frequency signal at second frequency-intervals which is narrower than the first frequency intervals in a frequency range in the vicinity of (±kHz) the frequency, discriminates the second maximum value where the light intensity is maximized, and allows the following of the frequency even when the frequency of the radio-frequency signal which sets the intensity at the second maximum value is changed due to characteristic change of the selected-wavelength tuning filter (AOTF) by getting periodically implemented, outputting the frequency of the radio-frequency signal which sets the intensity at the second maximum value to the frequency controlling unit, and by having the environment change, such as having temperature changes or deterioration due to age.

Figure 8:
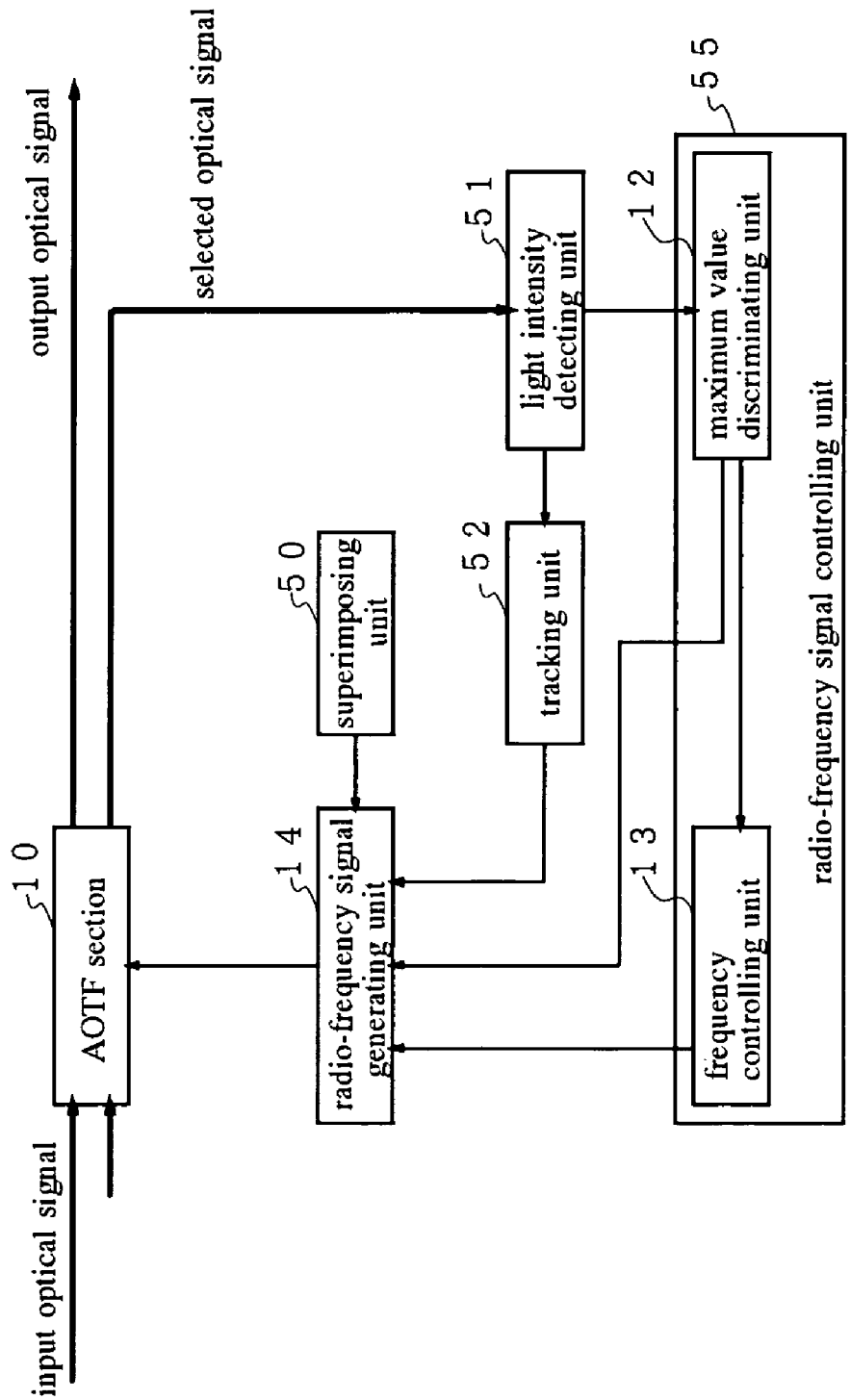
FIG. 8 is a block diagram showing a structure of the fifth embodiment.

In FIG. 8, the selected-wavelength tuning filter comprises the AOTF section 10, light intensity detecting unit 51, radio-frequency signal controlling unit 55, superimposing unit 50, tracking unit 52, and radio-frequency signal generating unit 54. And the radio-frequency signal controlling unit 55 comprises the maximum value discriminating unit 12 and the frequency controlling unit 13.

An input optical signal is entered to the AOTF section 10 and the optical signal selected by the AOTF section 10 is entered to the light intensity detecting unit 51 for detecting its light intensity. The output of the light intensity detecting unit 51 is inputted to the maximum value discriminating unit 12 and the tracking unit 52. On the other hand, the optical signal not selected by the AOTF section 10 is exited to the optical transmission line from the AOTF section 10 as an exited optical signal.

A radio-frequency signal applied to the first and second optical waveguides of the AOTF section 10 are generated by the radio-frequency signal generating unit 54. A modulation signal of frequency of 10 kHz to 1 MHz is superimposed to the radio-frequency signal by the superimposing unit 50 in implementing tracking. The maximum value discriminating unit 12, the frequency controlling unit 13 and the tracking unit 52 control the frequency of the radio-frequency signal generating unit 54.

The output of the maximum value discriminating unit 12 is inputted to the frequency controlling unit 13 to control the frequency of the radio-frequency signal so as to select a specific wavelength.

Then, the tracking unit 52 controls the radio-frequency signal generating unit 54 so that the light intensity of the optical signal of a predetermined wavelength is kept maximum by detecting the modulation signal superimposed by the radio-frequency signal from the optical signal dropped and exited from the AOTF section 10 by the light intensity detecting unit 51.

By configuring as described above, the selected-wavelength tuning filter can control and keep the optimum radio-frequency signal frequency by tracking after the frequency of the radio-frequency signal for selecting the optical signal of the specific wavelength is once discriminated.

Still more, the modulation signal for tracking is set to have any frequency from 10 kHz to 1 MHz. While the modulation signal of 1 kHz is applied to an optical signal in an adjustable bias control (ABC) circuit of an LN modulator, the modulation signal for tracking will not be confused with the modulation signal of the ABC circuit because it is set at the frequency of 10 kHz or more. On the other hand, because the modulation signal for tracking is set at 1 MHz or less, it will not become a burden for a CPU even if, for instance, the modulation signal is generated by the CPU controlling the frequency data of a PLL circuit within the radio-frequency signal generating unit 54 so that it becomes a sinusoidal wave because it is not by a high-speed modulation or a simultaneous detection.

Besides, in case when an optical input signal is a wavelength-division multiplexed optical signal, it is better to make the frequency of the radio-frequency signal generated by the radio-frequency signal generating unit 54 changed within the range of the frequency of the radio-frequency signal in accordance with the interval of the wavelength-division multiplexing optical signal.

When the frequency of the modulation signal for tracking is swung largely in applying tracking, it affects the neighboring ch. However, no largely deviated frequency is applied by configuring as described above, so that it will affect no other ch.

In case of, for example, a WDM optical signal at 0.8 nm intervals, the difference of frequency of the radio-frequency signal to the neighboring ch is 90 kHz, so that tracking is implemented with frequency of ±45 kHz or less.

Next, the sixth embodiment will be explained.

Figure 10:
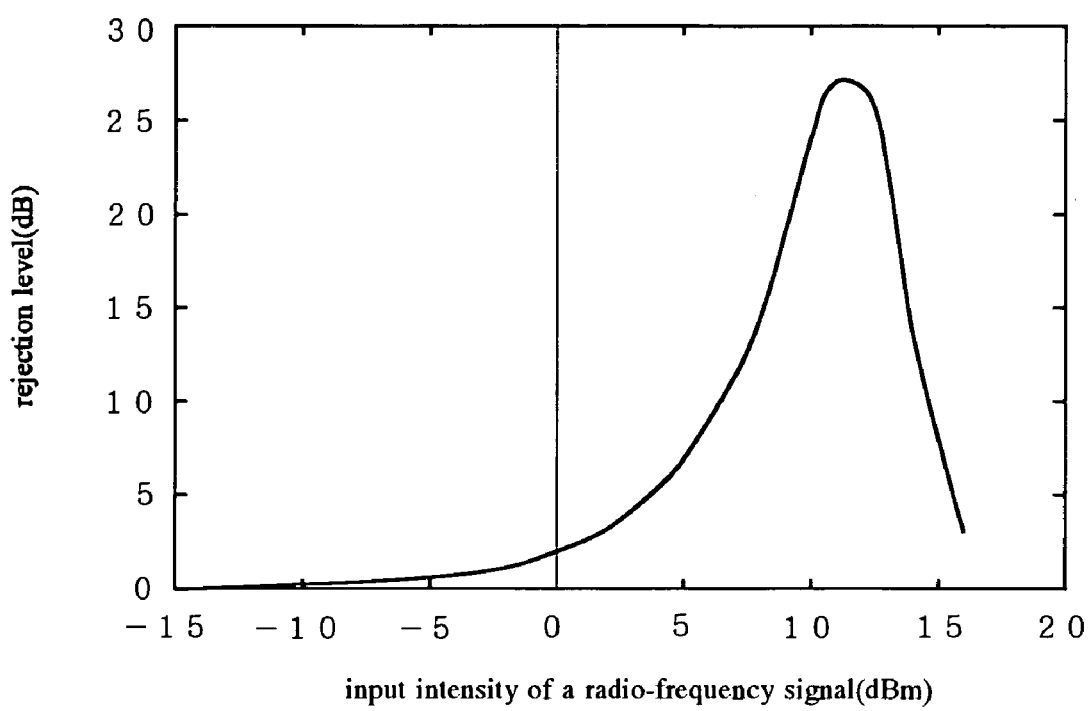
FIG. 10 is a graph showing the relationship between an input intensity of a radio-frequency signal and rejection levels.

FIG. 10 is a graph showing the relationship between input intensity of a radio-frequency signal and a rejection level. The ordinate in FIG. 10 represents the rejection level indicating light intensity of reject light/light intensity of input light in unit of dB and the abscissa represents input intensity of the radio-frequency signal indicated in unit of dBm. The rejection level which is the intensity of light selected by the AOTF depends on the input intensity of the radio-frequency signal and assumes the maximum value at the specific input intensity as shown in FIG. 10. It is noted that this characteristic is substantially the same even when the RF frequency is changed.

Figure 9:
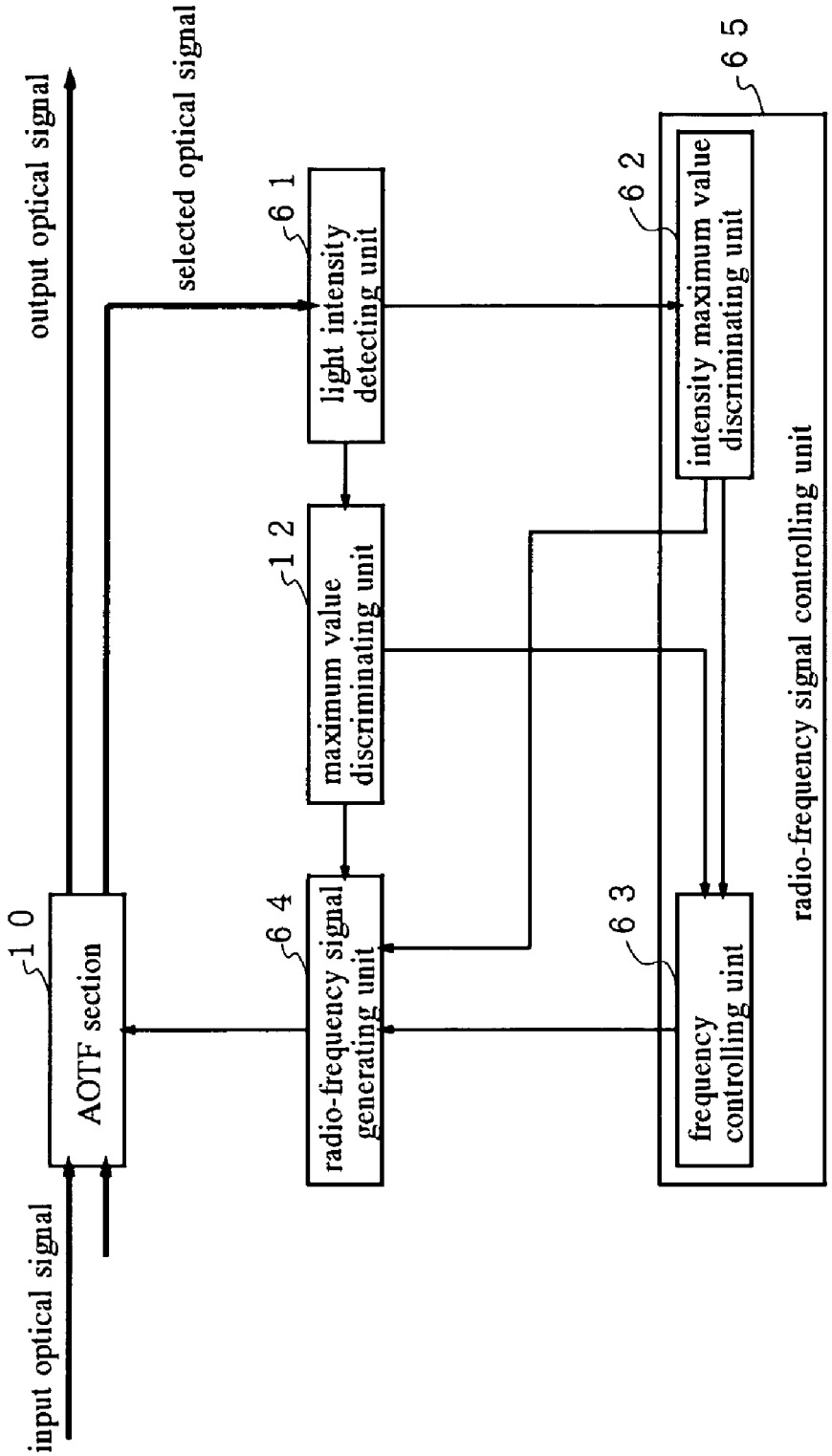
FIG. 9 is a block diagram showing a structure of the sixth embodiment.

In FIGS. 9 and 10, the selected-wavelength tuning filter comprises the AOTF section 10, light intensity detecting unit 61, radio-frequency signal controlling unit 65, frequency controlling unit 63, and radio-frequency signal generating unit 64. And the radio-frequency signal controlling unit 65 comprises the maximum value discriminating unit 12 and intensity maximum value discriminating unit 62.

An input optical signal is entered to the AOTF section 10 and the optical signal selected by the AOTF section 10 is entered to the light intensity detecting unit 61 that detects its light intensity. An output of the light intensity detecting unit 61 is inputted to the maximum value discriminating unit 12 and the intensity maximum value discriminating unit 62. On the other hand, the optical signal not selected by the AOTF section 10 is exited to the optical transmission line from the AOTF section 10 as an exited optical signal.

A radio-frequency signal applied to the first and second optical waveguides of the AOTF section 10 is generated by the radio-frequency signal generating unit 64 whose frequency is controlled by the maximum value discriminating unit 12, the intensity maximum value discriminating unit 62 and the frequency controlling unit 63.

An output of the maximum value discriminating unit 12 is inputted to the frequency controlling unit 63 and controls the frequency of the radio-frequency signal so as to select a specific wavelength.

Then, the intensity maximum value discriminating unit 62 discriminates the maximum value of the light intensity with respect to an optical signal of a predetermined wavelength by detecting the optical signal of the predetermined wavelength by the light intensity detecting unit 11 while changing output intensity of the radio-frequency signal generated by the radio-frequency signal generating unit 64 while maintaining the frequency of the radio-frequency signal which sets light at the maximum intensity.

The frequency controlling unit 63 receives the value of input intensity of the radio-frequency signal from the intensity maximum value discriminating unit 62 and controls the radio-frequency signal generating unit 64 by the optimum radio-frequency signal frequency and the input intensity.

Thus, the selected-wavelength tuning filter can optimize not only the frequency of the radio-frequency signal for dropping/adding the specific wavelength but also the input intensity of the radio-frequency signal because it can discriminate the input intensity of the radio-frequency signal which sets the intensity at the maximum value of the rejection level as shown in FIG. 10.

Next, the seventh embodiment will be explained.

Figure 11:
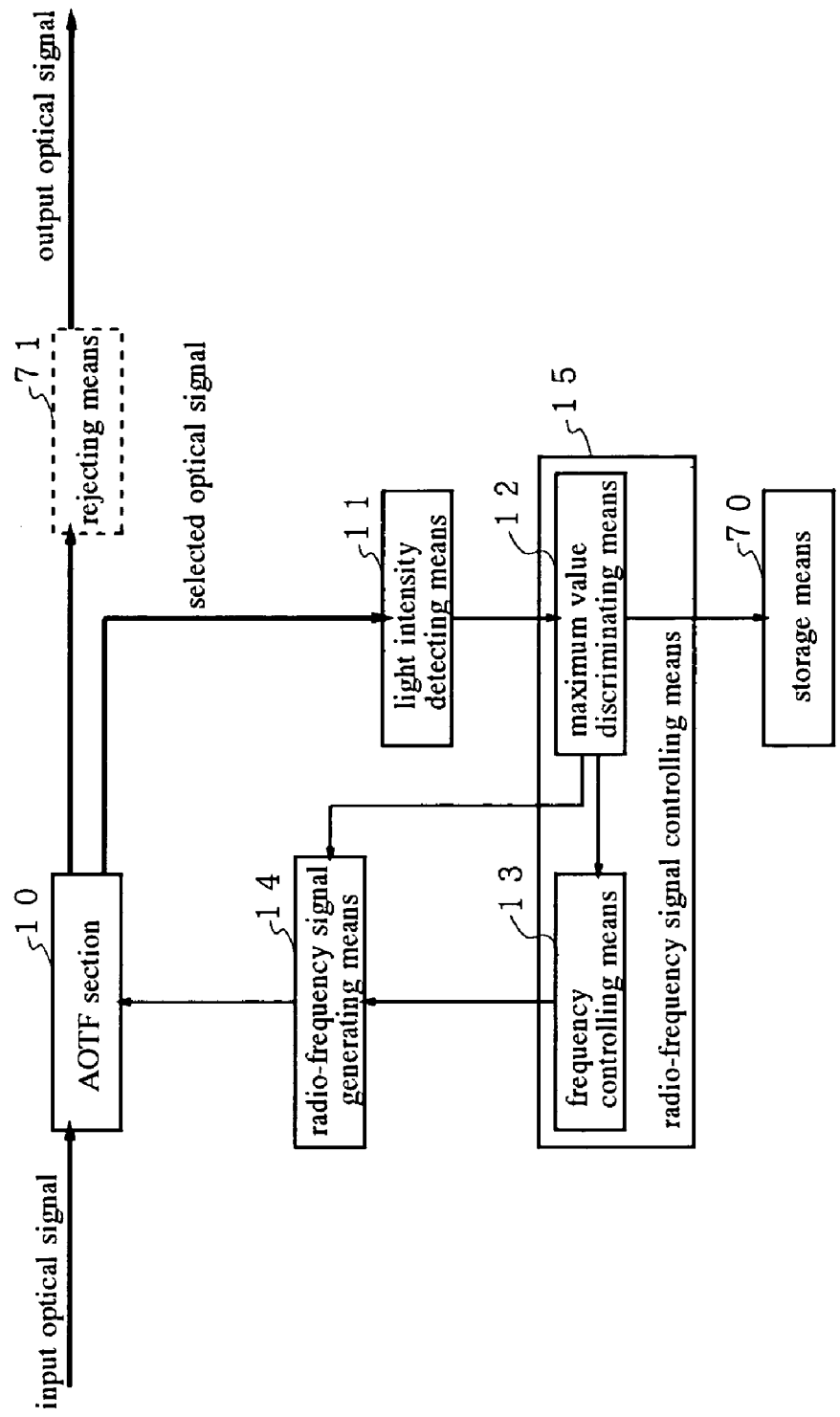
FIG. 11 is a block diagram showing a structure of the seventh embodiment.

In FIG. 11, an optical spectrum analyzer comprises the AOTF section 10, the light intensity detecting unit 11, the radio-frequency signal controlling unit 15, the radio-frequency signal generating unit 14, and storage unit 70. And, the radio-frequency signal controlling unit 15 comprises the maximum value discriminating unit 12 and the frequency controlling unit 13.

An input optical signal is entered to the AOTF section 10 and the optical signal dropped by the AOTF section 10 is entered to the light intensity detecting unit 11. An output of the light intensity detecting unit 11 is inputted to the maximum value discriminating unit 12. On the other hand, the optical signal not dropped by the AOTF section 10 is exited to the optical transmission line from the AOTF section 10 as an exited optical signal.

The radio-frequency signal applied to the first and second optical waveguides of the AOTF section 10 is generated by the radio-frequency signal generating unit 14 whose frequency is controlled by the maximum value discriminating unit 12 and the frequency controlling unit 13.

An output of the maximum value discriminating unit 12 is inputted to the frequency controlling unit 13. The frequency controlling unit 13 controls the frequency of the radio-frequency signal so as to drop/add a specific wavelength.

The maximum value discriminating unit 12 outputs all values of frequency generated by the radio-frequency signal generating unit and values of light intensities corresponding to each frequency to the storage unit 70. The storage unit 70 stores all of these values.

The light intensity can be discriminated in accordance to the wavelength of each optical signal from the values stored in the storage unit 70 by using the relationship between the radio-frequency signal and the selected wavelength shown in FIG. 3 described above because one of set of the frequency of the radio-frequency signal for dropping/adding the optical signal of the predetermined wavelength can be found in the maximum value discriminating unit 12 by having the above configuration.

Besides, the optical spectrum analyzer described above may further comprises rejecting unit 71 for rejecting the optical signal while connected to the output side for outputting an optical signal to be transmitted.

The optical signal not dropped by the optical spectrum analyzer is exited to an optical device connected to the optical spectrum analyzer such as the next tributary station or node. Specifically, crosstalk occurs between the optical signal not dropped by the optical spectrum analyzer and the optical signal entered from the optical transmission line in the AOTF section for dropping/adding the optical signal in the OADM when the optical spectrum analyzer is used as the optical signal generating unit of the OADM.

However, by having the above configuration, there will be no such problems because of the rejection of the optical signal not dropped by the optical spectrum analyzer.

For example, an optical attenuator may be used as the rejecting unit 71. It is also possible to reject the optical signal by using an optical switch, i.e., by switching to an output to which nothing is connected in the optical switch. The optical signal may be rejected also by using an optical amplifier and not providing excited light of the optical amplifier. It is also possible to reject the optical signal by using an optical modulator and disconnecting the power source of the optical modulator. It is also possible to reject the optical signal by using an AOTF and selecting light having a wavelength separated from the wavelength of the optical signal in the AOTF.

Besides, the OADM is able to have both functions of selecting an optical signal and an optical spectrum analyzer by using the optical spectrum analyzer described above as the AOTF.

Next, the eighth embodiment will be explained.

The eighth embodiment is an embodiment of the selected-wavelength tuning filter and the OADM.

Figure 12:
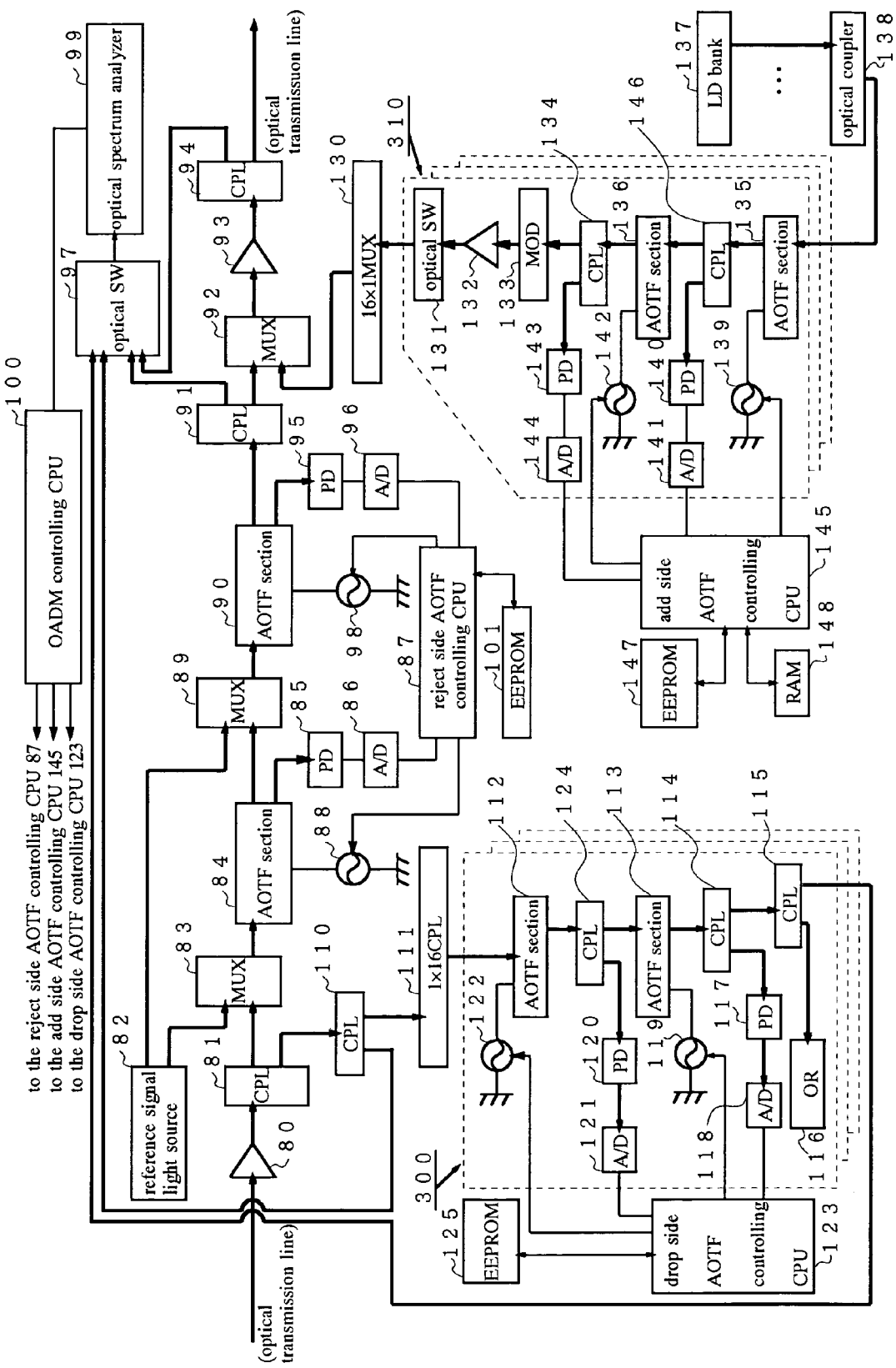
FIG. 12 is a block diagram showing a structure of an OADM according to the eighth embodiment.

As shown in FIG. 12, the OADM may be divided roughly into three structural parts. The first structural part is a receiving processing part for receiving the optical signal of the specific wavelength dropped as necessary from the 32 waves of a WDM optical signal transmitting through the optical transmission line. The second part is a rejecting part for rejecting the optical signal having the same wavelength with the optical signal dropped to the receiving processing part from being transmitted to the next node by removing it from the optical transmission line. The third structural part is an adding part for generating and adding an optical signal to an empty ch of the WDM optical signal. It is noted that the receiving processing part, the rejecting part, and the adding part can process 16 waves, respectively.

Thus, the OADM is composed of the three structural parts and the selected-wavelength tuning filter of the present invention is used in each structural part, so that the selected-wavelength tuning filter in each structural part will be explained below.

The structure of the rejecting part of the eighth embodiment will be explained.

At first, the rejecting part will be explained.

Figure 13:
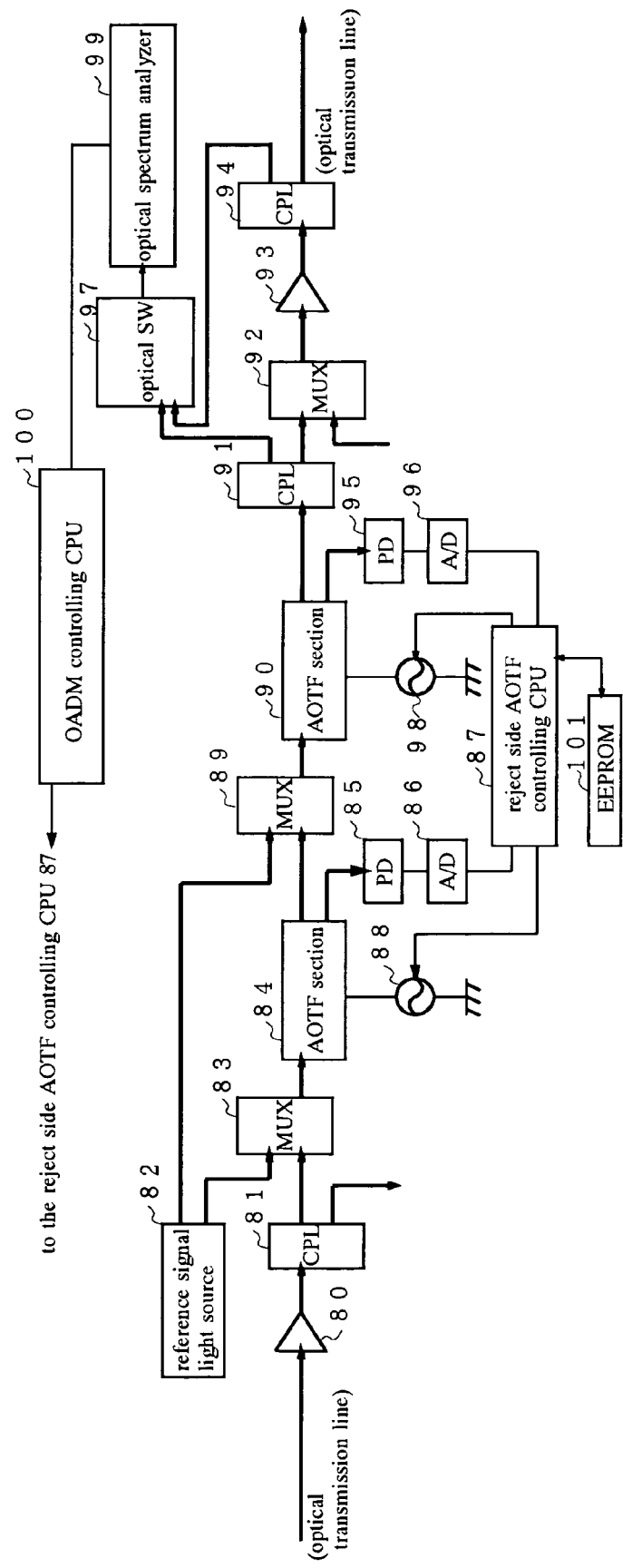
FIG. 13 is a block diagram showing a structure of a rejecting part of the OADM according to the eighth embodiment.

FIG. 13 is a block diagram showing the structure of the rejecting part in the OADM of the eighth embodiment.

As shown in FIGS. 12 and 13, the 32 waves of a WDM optical signal which has transmitted through the optical transmission line enter an optical amplifier 80 for amplifying light intensity. Each ch interval of the WDM optical signal is set at 0.8 nm in accordance to the rule of ITU-T G. 692 Recommendation. The amplified WDM optical signal enters an optical coupler 81 for branching the light into two. One of the branched WDM optical signals enters an optical coupler 110 of the receiving processing part described later and the other thereof enters an optical multiplexer 83.

On the other hand, a reference signal light source 82 generates the first reference signal for discriminating the relationship between frequency of a radio-frequency signal and a selected wavelength in the AOTF sections 84 and 90 described later and the second reference signal and these reference signals enter the optical multiplexers 83 and 89. While these reference signals may have any wavelength except of the wavelength used for the WDM optical signal, it is desirable to have a wavelength on both sides of the wavelength band of the WDM optical signal so as not to be mixed with the WDM optical signal. When the wavelength band of the WDM optical signal is M band, the wavelength on the ends of the M band is used so that the reference signals are kept in the AOTF sections 84 and 90 in which they are used and are not exited to the optical transmission line. The first reference signal is set at a wavelength between 1,530 nm and 1,545 nm, e.g., 1,530 nm. The second reference signal is set at a wavelength between 1,565 nm and 1,570 nm, e.g., 1,570 nm. By setting the reference signals at the wavelength described above, these reference signals are disposed in a gain slope part of a relay optical amplifier normally used for the M band. Therefore, the reference signals are attenuated while transmitting through the optical communication network even if they are outputted from the OADM.

The optical multiplexer 83 multiplexes the first and second reference signals from the reference signal light source 82 with the WDM optical signal entered from the optical coupler 81 and the wavelength-multiplexed optical signal enters the AOTF section 84.

Corresponding to the frequency of the radio-frequency signal applied by a radio-frequency signal source 88 generating the radio-frequency signal, the AOTF section 84 selects and drops the optical signal of the specific wavelength out of the entered optical signals and passes the optical signal not selected. The dropped optical signal enters a photodiode (hereinafter abbreviated as "PD") 85 for receiving the optical signal to detect its light intensity.

The PD 85 outputs an electrical signal on the level corresponding to the intensity of the received light to an A/D 86. The A/D 86 converts the received analog signal into a digital signal and transmits it to a rejecting side AOTF controlling CPU 87. The rejecting side AOTF controlling CPU 87 controls the AOTF sections 84 and 90, the radio-frequency signal sources 88 and 98, and others as described later by sending/receiving data to/from an EEPROM (Electric Erasable Programmable Read Only Memory) 101 storing various data.

The radio-frequency signal source 88 is controlled by the frequency of the radio-frequency signal and power (intensity) generated by the rejecting side AOTF controlling CPU 87. The radio-frequency signal source 88 is provided with 17 radio-frequency signal sources, i.e., 16 waves plus one, so as not to affect other ch between a certain ch to another ch in changing a ch to be rejected from the certain ch to the other ch.

The EEPROM 101 stores first reference signal scan starting RF frequency, first reference signal scan ending RF frequency, second reference signal scan starting RF frequency, second reference signal scan ending RF frequency, pitches for scanning reference signals, frequency pitches for tracking, reference signal scan starting RF power, reference signal scan ending power, power scan pitches, power pitches for tracking, a reference signal capturing threshold value and others.

On the other hand, the optical signal which has passed through the AOTF section 84 enters an optical multiplexer 89. The optical multiplexer 89 wavelength-multiplexes the optical signal again with the first and second reference signals entered from the reference signal source 82. The both reference signal and the optical signal are again wavelength-multiplexed since there is a part which does not enter the next AOTF section 90 when the reference signals are selected and branched by the AOTF section 84.

The wavelength-multiplexed optical signal enters the AOTF section 90. This AOTF section 90 selects and branches an optical signal of specific wavelength out of the entered optical signals corresponding to the frequency of the radio-frequency signal applied by the radio-frequency signal source 98 generating the radio-frequency signals and transmits a non-selected optical signal. The branched optical signal enters the PD 95, which receives the optical signal and detects its light intensity.

The PD 95 outputs an electrical signal on the level corresponding to the intensity of the received light to an A/D 96. The A/D 96 converts the received analog signal into a digital signal and transmits it to the rejecting side AOTF controlling CPU 87. The rejecting side AOTF controlling CPU 87 controls the frequency and power of the radio-frequency signal generated by the radio-frequency signal source 98.

On the other hand, the WDM optical signal which has passed through the AOTF section 90 enters an optical coupler 91 which branches the light into two. One branched WDM optical signal enters an optical spectrum analyzer 99 for monitoring a wavelength of light and its light intensity via an optical switch (hereinafter abbreviated as an "optical SW") 97 in order to confirm whether or not the desired optical signal is rejected by the AOTF sections 84 and 90. It is then confirmed by an OADM controlling CPU 100. When the desired optical signal is not rejected as a result of the confirmation, the OADM controlling CPU 100 sends a warning to the rejecting side AOTF controlling CPU 87 to cause it to reject again.

The optical SW 97 is controlled by the optical spectrum analyzer 99 as to which optical signal entered to the optical SW 97 should enter the optical spectrum analyzer 99 and the designated optical signal enters the optical spectrum analyzer 99. The optical spectrum analyzer 99 outputs a wavelength and data of light intensity of the detected light to the OADM controlling CPU 100. In accordance to the data from the optical spectrum analyzer 99, the OADM controlling CPU 100 controls a reject side AOTF controlling CPU 87, a drop side AOTF controlling CPU 123 and an addition side AOTF controlling CPU 145. Each control will be elucidated one by one in the following description besides the confirmation described above.

The other WDM optical signal branched by the optical coupler 91 enters an optical multiplexer 92 to be wavelength-multiplexed with an optical signal generated by the adding part described later. The wavelength-multiplexed WDM optical signal enters an optical amplifier 93 for amplifying light intensity to be amplified and enters an optical coupler 94. The optical coupler 94 branches this WDM optical signal into two. One branched WDM optical signal is transmitted to the optical transmission line. The other branched WDM optical signal enters the optical spectrum analyzer 99 via the optical SW 97 to confirm whether or not the optical signal generated by the adding part is wavelength-multiplexed by the optical multiplexer 92. It is then confirmed by the OADM controlling CPU 100. As a result of confirming, in case the desired optical signal is not multiplexed, the OADM controlling CPU 100 sends a warning to the adding side AOTF controlling CPU 145 to make it generate an optical signal to be added again.

Next, the control of the rejecting side AOTF controlling CPU 87 in the AOTF section 84 will be explained.

Figure 14:
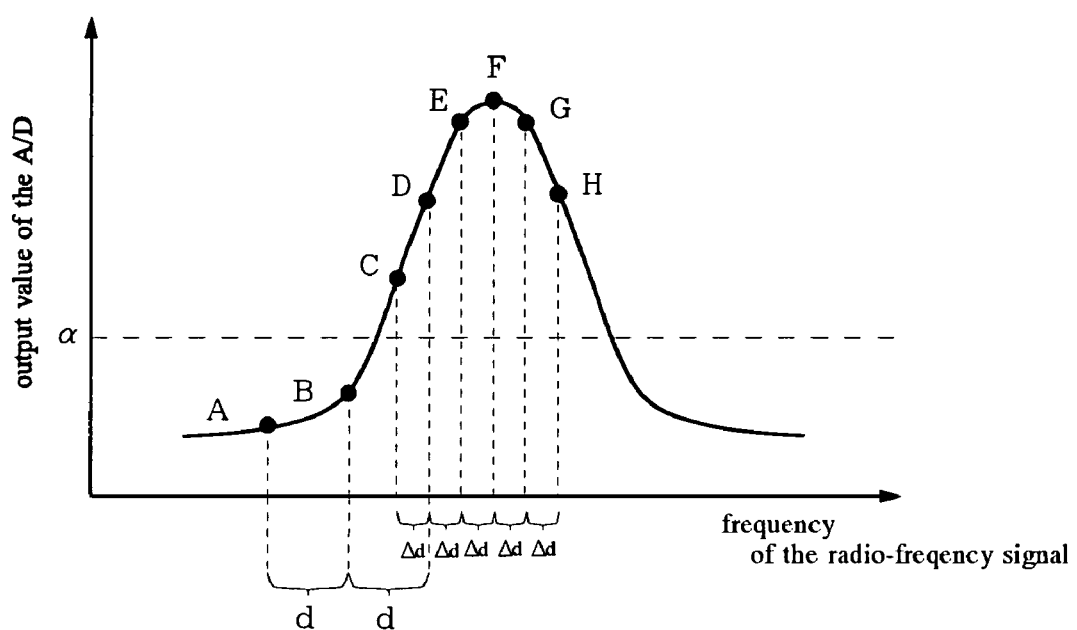
FIG. 14 is a graph for explaining a method for scanning the reference signal.

FIG. 14 is a graph explaining a method for scanning the reference signal. The ordinate of the graph represents an output value of the A/D 86 with respect to light intensity detected by the PD 85 and the abscissa represents the frequency of the radio-frequency signal.

Receiving a reject request from the OADM controlling CPU 100, the rejecting side AOTF controlling CPU 87 discriminates which ch should be rejected (#1).

Then, the rejecting side AOTF controlling CPU 87 reads first reference signal scan starting RF frequency fa (Hz) and reference signal scan starting RF power Pa (dBm) stored in the EEPROM 101 and transmits these data to the radio-frequency signal source 88 (#2). This first reference signal scan starting RF frequency fa is set at frequency lower than the frequency of the radio-frequency signal for selecting and dropping the first reference signal. Further, since the frequency of the radio-frequency signal for selecting and dropping the first reference signal depends on temperature as described before, a plurality of frequencies fa are prepared per temperature at adequate temperature intervals in the EEPROM 101.

Then, the radio-frequency signal source 88 generates the radio-frequency signal of the received frequency fa and power (intensity) Pa and applies it to the AOTF section 84 (#3).

The rejecting side AOTF controlling CPU 87 monitors the A/D 86 and judges whether the output value of the A/D 86 is greater or smaller than a reference signal capturing threshold value stored in the EEPROM 101. When it is smaller (point A in FIG. 14), the rejecting side AOTF controlling CPU 87 finds frequency fb of a radio-frequency signal to be scanned next by using pitches for scanning reference signals d (Hz) stored in the EEPROM 101 from the following equation:

$$fb = fa + d \quad (1)$$

and transmits it to the radio-frequency signal source 88 anew (#4).

Then, the radio-frequency signal source 88 generates a radio-frequency signal of the received frequency fb and the power Pa received at first and applies it to the AOTF section 84 (#5).

The rejecting side AOTF controlling CPU 87 monitors the A/D 86 and judges whether an output value of the A/D 86 is greater or smaller than the reference signal capturing threshold value stored in the EEPROM 101 (#6).

The rejecting side AOTF controlling CPU 87 repeats the processes from #4 to #6 until when the output value of the A/D 86 becomes greater than (#7).

When the output value of the A/D 86 is greater than (point D in FIG. 14, frequency of radio-frequency signal fd) on the other hand, the rejecting side AOTF controlling CPU 87 finds frequencies $\Delta fa$ and $\Delta fb$ of the radio-frequency signal to be scanned next centering on fd by using frequency pitches for tracking $\Delta d$ (Hz) stored in the EEPROM 101 from the following equations:

$$\Delta fa = fd + \Delta d \quad (2)$$

$$\Delta fb = fd - \Delta d \quad (3)$$

and transmits $\Delta fa$ and $\Delta fb$ to the radio-frequency signal source 88 one by one anew (#8).

Then, the rejecting side AOTF controlling CPU 87 monitors the A/D 86 and compares an output value of the A/D 86 with respect to $\Delta fa$ (point E in FIG. 14) with an output value of the A/D 86 with respect to $\Delta fb$ (point C in FIG. 14) (#9).

In this case, the output value of the A/D 86 with respect to $\Delta$ fa is greater, therefore the rejecting side AOTF controlling CPU 87 shifts the center of the frequency from fd to $\Delta fa$ and implements the Steps #8 and #9 (#10).

As described above the frequency whose output value of the A/D 86 is greater is shifted to the center of the frequency to be scanned next and is scanned, as a result, the center frequency shifts to points D, E, and F in FIG. 14. When the center frequency shifts to the point F and the output values of the A/D 86 at points E and G are compared with the output value of the A/D 86 at the point F, the point F may be discriminated as the maximum value since they cannot exceed the output value of the A/D 86 of the point F.

The rejecting side AOTF controlling CPU 87 judges the maximum value as described above and stops scanning (#11).

Then, the rejecting side AOTF controlling CPU 87 sets the frequency that provides the maximum value (frequency of the point F in FIG. 14) as frequency f (1) of the radio-frequency signal with respect to the first reference signal (#12).

The rejecting side AOTF controlling CPU 87 repeats the processes from #2 through #12 to discriminate frequency f (2) of a radio-frequency signal with respect to the second reference signal. However, it uses second reference signal scan starting RF frequency faa (Hz) instead of the first reference signal scan starting RF frequency fa (Hz) in #2 and uses the following equation instead of equation (1) (#13):

$$fbb = faa - d \quad (4)$$

Then, the rejecting side AOTF controlling CPU 87 calculates frequency of a radio-frequency signal for selecting and rejecting each ch based on f(1), f(2), the difference between the wavelength of the first reference signal and the wavelength of ch 1, the difference between the wavelength of the second reference signal and the wavelength of ch 32, and each ch interval (#14).

Then, the rejecting side AOTF controlling CPU 87 optimizes the power of the radio-frequency signal for each ch. At first, it transmits the frequency of the radio-frequency signal and the reference signal scan starting RF power Pa (dBm) corresponding to ch 1 to the radio-frequency signal source 88 (#15).

The explanation of the method for optimizing the power of the radio-frequency signal will be omitted here since the maximum value may be discriminated in the same manner just by setting Pa as the first center and by replacing frequency pitches for tracking Δdf (Hz) with power pitches for tracking Δdp (Hz) in the processes from #8 through #11.

Then, the OADM controlling CPU 100 made the optical spectrum analyzer 99 monitor the WDM optical signal exited from the AOTF section 90 after rejection via the optical coupler 91 and the optical SW 97 to check whether or not the desired signal has been rejected and measure the degree of the rejection level (#16).

Receiving these data from the optical spectrum analyzer 99, the OADM controlling CPU 100 transmits the rejection level to the rejecting side AOTF controlling CPU 87. Further, when the reject ch is wrong, the OADM controlling CPU 100 also transmits a warning to the rejecting side AOTF controlling CPU 87 (#17).

The rejecting side AOTF controlling CPU 87 judges whether or not the received rejection level is greater than a rejection level threshold value β (dBm) stored in the EEPROM 101. In case the received rejection level is smaller than β or the rejecting side AOTF controlling CPU 87 receives the warning, it scans the first and second reference signals again (#18).

Scanning of the frequency and power of the radio-frequency signal with respect to the AOTF section 90 is carried out by the rejecting side AOTF controlling CPU 87 under the control similar to the processes from #1 through #18, so that its explanation will be omitted here.

Then, the rejecting side AOTF controlling CPU 87 calculates the frequency of the radio-frequency signal corresponding to ch to be rejected and applies the radio-frequency signal of that frequency to the AOTF section 84 or the AOTF section 90 to reject a desired ch (#19).

It is noted that when there is only the first reference signal and there is no second reference signal as the reference signal, the EEPROM 101 stores values of changing a selected wavelength with respect to changing frequency of a unit radio-frequency signal instead of the second reference signal scan starting RF frequency and the second reference signal scan ending RF frequency.

Then, the rejecting side AOTF controlling CPU 87 calculates the frequency of the radio-frequency signal for selecting and rejecting each ch based on f (1), the difference between the wavelength of the first reference signal and the wavelength of ch 1, the value of changing the selected wavelength with respect to the changing frequency of the unit radio-frequency signal, and each ch interval instead of #13 and #14.

The rejecting side AOTF controlling CPU 87 searches for the frequency of the radio-frequency signal for rejecting the ch before rejecting the optical signal of the desired ch as described above so that it can compensate for the shift of the frequency of the radio-frequency signal caused by temperature change or the like. Accordingly, it can reject the optical signal of the desired ch accurately.

It is noted that while the processes from #1 through #19 may be repeated every time when the optical signal of the desired ch is rejected, the optimization of the power of the radio-frequency signal in #15 may be omitted by using the result obtained previously because the relationship between the input intensity of the radio-frequency signal and the rejection level shows substantially the same characteristic even when the frequency of the radio-frequency signal is changed as described before in FIG. 10.

Further, although the reference signal is added to the WDM optical signal by the reference signal light source 82 as described above, an OSC (Optical Supervisory Channel) which is a monitoring signal in operating an optical communication network may be used as the reference signal.

While it is possible to reject an optical signal of a desired ch accurately by applying the optimum radio-frequency signal frequency to the AOTF sections 84 and 90, there is a case when the optimum radio-frequency signal shifts due to temperature change, shift of frequency of the radio-frequency signal, and fluctuation even during rejection. Therefore, it is necessary to track the optimum radio-frequency signal frequency in order to reject the desired ch accurately.

Next, the tracking will be explained.

Figure 15:
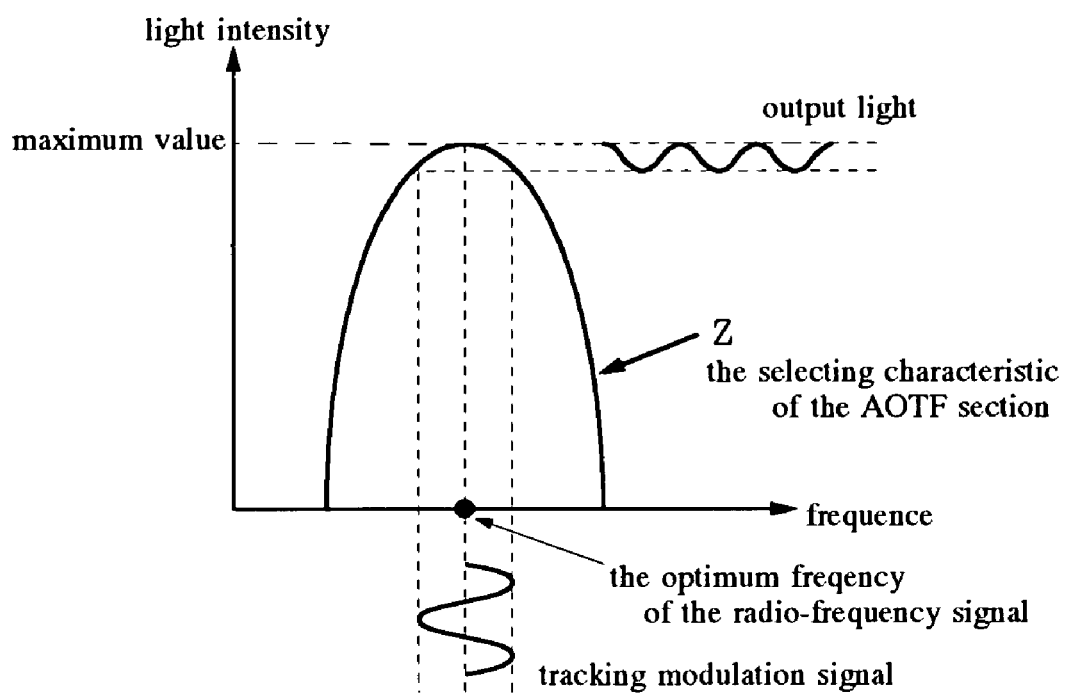
FIG. 15 is a graph showing the relationship between a tracking modulation signal and output light.

FIG. 15 is a graph showing the relationship between a modulation wavelength for tracking and output light.

The ordinate of the figure represents light intensity and the abscissa represents frequency of a radio-frequency signal. A curve Z that is substantially symmetrical and is convex upward indicates the selecting characteristic of the AOTF section. In FIG. 15, the frequency of the radio-frequency signal giving the maximum light intensity is the optimum frequency of the radio-frequency signal for rejecting the desired ch found above. A curve below the abscissa indicates sinusoidal modulation signal for tracking, to which a curve at the upper right of the curve Z indicating output light corresponds.

Since tracking in the AOTF section 84 is similar to tracking in the AOTF section 90, the tracking in the AOTF section 84 will be explained below.

In FIGS. 12, 13, and 15, the rejecting side AOTF controlling CPU 87 controls the radio-frequency signal source 88 to shift the frequency of the radio-frequency signal applied to the AOTF section 84 slightly centering on the optimum frequency to generate the modulation signal for tracking shown in FIG. 15. This modulation signal is set to have frequency of 10 kHz to 1 MHz, e.g., 20 kHz.

The optical signal of the desired ch to be rejected at the AOTF section 84 contains this modulation signal component, which is selected and dropped by the AOTF section 84 and enters the PD 85. The PD 85 detects light intensity of this optical signal and outputs it to the rejecting side AOTF controlling CPU 87 via the A/D 86. Therefore, the rejecting side AOTF controlling CPU 87 can obtain an output value of the light intensity corresponding to this modulation signal.

Here, there is no problem even when the optical signal is modulated by the modulation signal for tracking since it is the optical signal to be originally rejected in the AOTF section 84.

The rejecting side AOTF controlling CPU 87 controls the A/D 86 so that its output value becomes the maximum. When the frequency of the radio-frequency signal is shifted a little to the higher and lower parts and the output values of the A/D 86 become small at both parts where the frequency is higher and lower, the output value of the A/D 86 becomes the maximum at the center frequency thereof since the curve Z is substantially symmetrical and is convex upward as shown in FIG. 15.

The optimum radio-frequency signal frequency can be maintained by controlling so that the output value of the A/D 86 becomes the maximum as described above.

Here, although the range in which the frequency of the radio-frequency signal is shifted to the higher and lower parts is very little, the difference of the frequency of the radio-frequency signal with respect to the neighboring ch must be at least within ±45 kHz since it is 90 kHz in case of the WDM optical signal whose interval is 0.8 nm. Otherwise, the neighboring ch will be rejected.

It is noted that the optimum radio-frequency signal frequency can be maintained by detecting the cycle of the output value of the A/D 86 when a frequency counter is provided in the rejecting side AOTF controlling CPU 87. That is, when the frequency of the radio-frequency signal generated by the radio-frequency signal source 88 coincides with the frequency that sets the output value of the A/D 86 at the maximum value, this output value reciprocates once from the maximum value of the curve Z to the higher frequency side and reciprocates once to the lower frequency side while the modulation signal for tracking cycles once, so that it becomes a sinusoidal wave having two times of frequency of this modulation signal. On the other hand, when the frequency of the radio-frequency signal generated by the radio-frequency signal source 88 does not coincide with the frequency that sets the output value of the A/D 86 at the maximum value, this output value does not generate frequency which is twice of the modulation signal.

Accordingly, the optimum frequency of radio-frequency signal that sets the output value of the A/D 86 can be always maintained by controlling the frequency of the radio-frequency signal so that the output value of twice of the cycle of the modulation signal can be obtained.

Thus, after once discriminating the frequency of the radio-frequency signal for dropping/adding the optical signal of the specific wavelength in the AOTF section 84, the optimum radio-frequency signal frequency may be controlled by tracking.

Further, the modulation signal for tracking is not mixed up with a modulation signal of 1 kHz which has been already superimposed for a variable bias control circuit of an LN modulator since the modulation signal for tracking is set at 20 kHz within the range from 10 kHz to 1 MHz. Still more, since the modulation signal is 1 MHz or less and is not a high-speed modulation, it will not burden the rejecting side AOTF controlling CPU 87.

Next, the receiving processing part will be explained.

At first, the structure of the receiving processing part according to the eighth embodiment will be explained.

Figure 16:
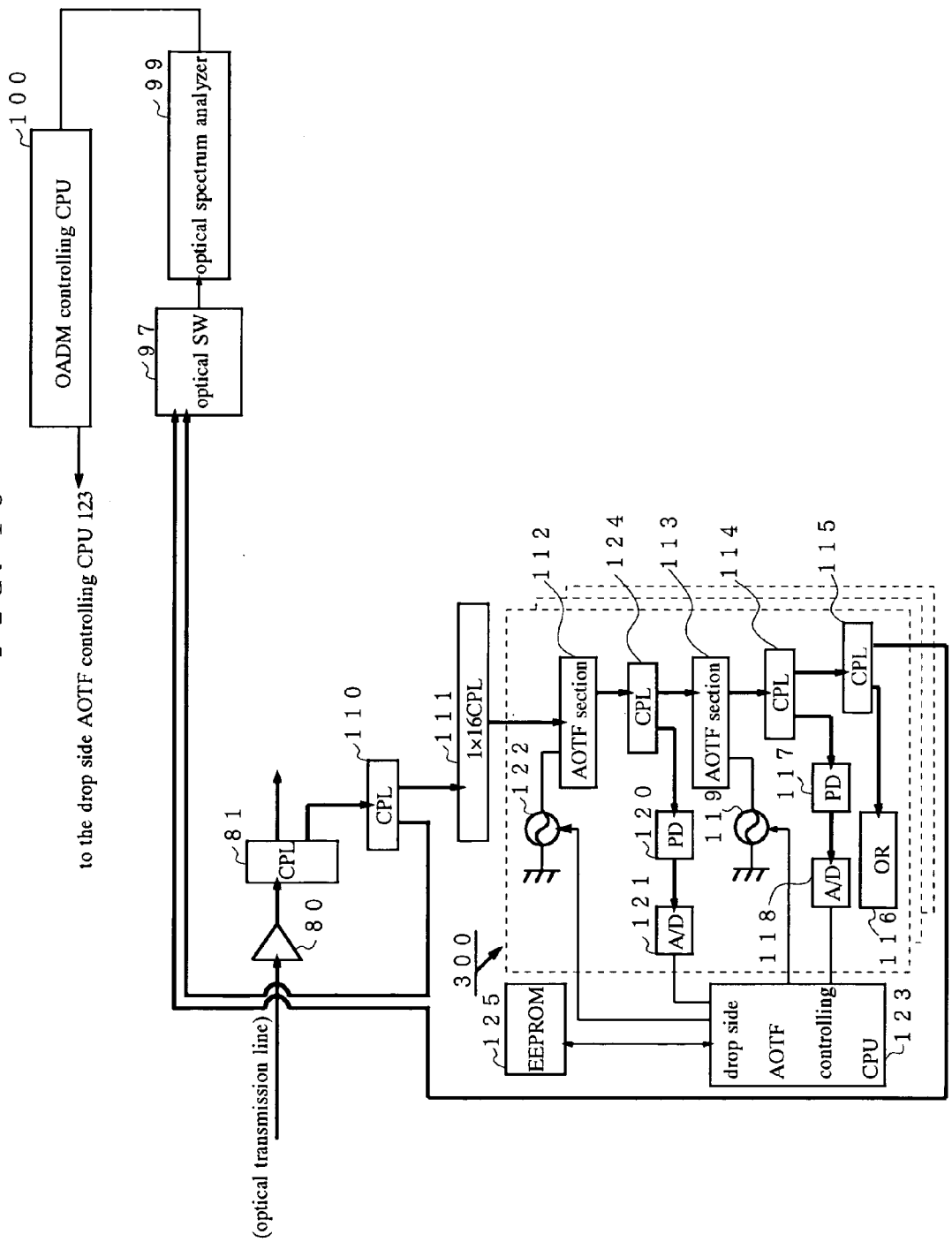
FIG. 16 is a block diagram showing a structure of receiving processing part of the OADM according to the eighth embodiment.

FIG. 16 is a block diagram showing the structure of the receiving processing part of the OADM according to the eighth embodiment. It is noted that while there are 16 receiving processing parts 300 each comprising AOTF sections 112 and 113, a radio-frequency signal sources 119 and 122, PDs 117 and 120, A/Ds 118 and 121, optical couplers 114, 115, and 124, and an optical receiver 116 to implement the receiving process of 16 waves, their structure is the same. Therefore, FIGS. 12 and 15 show only the part for receiving one wave. Still more, because their explanation is also the same, only the part for receiving one wave will be explained below.

In FIG. 16, the 32 waves of a WDM optical signal dropped by the optical coupler 81 described above enters an optical coupler 110 for branching the light into two. One WDM optical signal branched by the optical coupler 110 enters to the optical spectrum analyzer 99 via the optical SW 97 to confirm whether or not the 32 waves of a WDM optical signal is branched by the optical coupler 81. Then, the OADM controlling CPU 100 confirms it. When the OADM controlling CPU 100 confirms that the WDM optical signals have been branched, it transmits a signal to a branch side AOTF controlling CPU 123 described later to make the branch side AOTF controlling CPU 123 receive and process.

On the other hand, the other WDM optical signal branched by the optical coupler 110 enters a 1×16 optical coupler 111 to be distributed into 16 WDM optical signals of 32 waves. Accordingly, the WDM optical signal exited from 1×16 optical coupler 111 contains the optical signal of 32 waves. It is noted that 1×16 optical coupler 111 is used as the optical coupler for distributing into 16 signals here, it corresponds to that the OADM in the eighth embodiment can drop/add 16 waves. That is, if the OADM can drop/add 8 waves, it is the optical coupler distributing into 8 lights that may be used. In this case, there may be eight receiving processing parts 300.

The WDM optical signal distributed by the 1×16 optical coupler 111 enters the AOTF section 112. The AOTF section 112 selects and branches the optical signal of the specific wavelength out of the entered optical signal corresponding to the frequency of the radio-frequency signal applied by the radio-frequency signal source 122 which generates the radio-frequency signal. The optical signal not selected is abandoned as it is. On the other hand, the optical signal selected and branched by the AOTF section 112 is branched by the optical coupler 124 which branches light into two light. One optical signal branched by the optical coupler 124 enters the PD 120 for receiving the optical signal to detect its light intensity.

The PD 120 outputs an electrical signal on the level corresponding to the intensity of the received light to the A/D 121. The A/D 121 converts the received analog signal into a digital signal and transmits it to the branch side AOTF controlling CPU 123. The branch side AOTF controlling CPU 123 sends/receives data to/from an EEPROM 125 which stores data of scan starting RF frequency, scan ending RF frequency, scan RF power, values of changing selected wavelength with respect to changing frequency of the unit radio-frequency signal, and others to control the AOTF sections 112 and 113, the radio-frequency signal sources 119 and 122, and other as described later.

The branch side AOTF controlling CPU 123 also controls the frequency and power of the radio-frequency signal generated by the radio-frequency signal source 122.

On the other hand, the other optical signal branched by the optical coupler 124 enters the following AOTF section 113, which selects and branches an optical signal of a specific wavelength out of the entered optical signals corresponding to the frequency of the radio-frequency signal applied by the radio-frequency signal source 119 for generating the radio-frequency signal. The AOTF section 113 selects and branches the same ch again as the AOTF section 112 did.

Thus, the two AOTFs are connected in tandem to eliminate an influence which is otherwise caused by the neighboring ch of the desired ch and to select the desired ch reliably since the range of the wavelength selecting characteristic of the AOTF is wide.

The optical signal selected and branched by the AOTF section 113 enters the optical coupler 114 for branching the optical signal into two. One optical signals branched by the optical coupler 114 enters the PD 117, which receives the optical signal and detects its light intensity.

This PD 117 outputs an electrical signal on the level corresponding to the intensity of the received light to the A/D 118. The A/D 118 converts the received analog signal into a digital signal and transmits it to the branch side AOTF controlling CPU 123.

The branch side AOTF controlling CPU 123 also controls the frequency and power of the radio-frequency signal generated by the radio-frequency signal source 119.

On the other hand, the other optical signal branched by the optical coupler 114 enters the optical coupler 115 to be branched again into two. One optical signal branched by the optical coupler 115 enters the optical receiver 116, which demodulates the optical signal and receives and processes.

The other optical signal branched by the optical coupler 115 enters the optical spectrum analyzer 99 via the optical SW 97 to confirm whether or not the optical signal of the desired ch is selected and branched by the AOTF sections 112 and 113. Then, the OADM controlling CPU 100 confirms it. When the OADM controlling CPU 100 confirms that the optical signal of the desired ch is not selected and branched, it transmits a signal to the branch side AOTF controlling CPU 123. Then, the branch side AOTF controlling CPU 123 controls the AOTF sections 112 and 113 again to receive and process.

The control of the branch side AOTF controlling CPU 123 in the AOTF section 112 will be explained at first.

On receiving a request for receiving process from the OADM controlling CPU 100, the branch side AOTF controlling CPU 123 discriminates which ch should be received and processed (#31).

Then, the branch side AOTF controlling CPU 123 reads scan starting RF frequency fadr (Hz) and scan starting RF power Padr (dBm) stored in the EEPROM 101 and transmits these data to the radio-frequency signal source 122 (#32). The scan starting RF frequency fadr is set at frequency lower than the frequency of the radio-frequency signal for selecting and branching ch 1. Further, since the frequency of the radio-frequency signal for selecting and branching ch 1 depends on temperature as described before, a plurality of frequencies fadr are prepared per temperature in adequate temperature intervals in the EEPROM 125.

Then, the radio-frequency signal source 122 generates the radio-frequency signal of the received frequency fadr and power (intensity) Padr and applies it to the AOTF section 112 (#33).

The branch side AOTF controlling CPU 123 monitors the A/D 121 to judge whether an output value of the A/D 121 is greater or smaller than the reference signal capturing threshold value stored in the EEPROM 125. When it is smaller, the branch side AOTF controlling CPU 123 finds frequency fbdr of a radio-frequency signal to be scanned next by using scan pitch ddr (Hz) stored in the EEPROM 125 by the following equation:

$$fbdr = fadr + ddr \quad (5)$$

and transmits it to the radio-frequency signal source 122 anew (#34).

Then, the radio-frequency signal source 122 generates the radio-frequency signal of the received frequency fbdr and power Padr and applies it to the AOTF section 112 (#35).

The branch side AOTF controlling CPU 123 monitors the A/D 121 to judge whether an output value of the A/D 121 is greater or smaller than the reference signal capturing threshold value stored in the EEPROM 125 (#36).

The branch side AOTF controlling CPU 123 repeats the processes from #34 to #36 until when the output value of the A/D 121 becomes greater than dr (#37).

When the output value of the A/D 121 is greater than a dr, the branch side AOTF controlling CPU 123 uses frequency tracking interval Δddr (Hz) stored in the EEPROM 125 to find frequency Δfadr and Δfbdr of the radio-frequency signal to be scanned next centering on the frequency fedr applied to the radio-frequency signal source 122 at that time from the following equations:

$$\Delta fadr = fedr + \Delta ddr \quad (6)$$

$$\Delta fbdr = fedr - \Delta ddr \quad (7)$$

and transmits Δfadr and Δfbdr to the radio-frequency signal source 122 one by one anew (#38).

Then, the branch side AOTF controlling CPU 123 monitors the A/D 121 to compare the output value of the A/D 121 with respect to Δfadr and the output value of the A/D 121 with respect to Δfbdr (#39).

Then, when the output value of the A/D 121 with respect to Δfadr is greater than the output value of the A/D 121 with respect to Δfbdr, the center of the frequency is shifted from fedr to Δfadr to implement the Steps #38 and #39. On the other hand, when the output value of the A/D 121 with respect to Δ fbdr is greater than the output value of the A/D 121 with respect to Δfadr, the center of the frequency is shifted from fedr to Δfbdr to implement the Steps #38 and #39 (#40).

As described above, the frequency whose output value of the A/D 121 is greater is shifted to the center of the frequency to be scanned next and is scanned, the center frequency moves to frequency which sets the output value of the A/D 121 at the maximum value.

The branch side AOTF controlling CPU 123 thus judges the maximum value and stops scanning (#41).

Then, the branch side AOTF controlling CPU 123 sets the frequency which sets the output value of the A/D 121 at the maximum value as frequency f (ch 1) of ch 1 (#42).

The branch side AOTF controlling CPU 123 calculates the frequency of the radio-frequency signal for selecting and branching each ch out of f (ch 1), the wavelength of ch 1, the values of changing the selected wavelength with respect to changing frequency of a unit radio-frequency signal, and each ch interval (#43).

The branch side AOTF controlling CPU 123 also calculates the frequency of the radio-frequency signal for selecting and branching each ch for the AOTF section 113 under the similar control as in from #31 to #43 (#44).

Here, when two AOTF sections are connected in tandem as shown in FIGS. 12 and 16, the optical signal is selected and branched along the scan of the frequency of the radio-frequency signal while discriminating the relationship between the frequency of the radio-frequency signal and the selected wavelength of the preceding AOTF section 112 with respect to the propagating direction of the optical signal, so that the relationship between the frequency of the radio-frequency signal and the selected wavelength cannot be discriminated by the similar control as in from #31 to #43 in the following AOTF section 113. Therefore, the discrimination of the relationship between the frequency of the radio-frequency signal and the selected wavelength of the AOTF section 112 and the discrimination of the relationship between the frequency of the radio-frequency signal and the selected wavelength of the AOTF section 113 must be carried out in a time-division manner. It is the same in the case when pluralities of AOTF sections are connected in tandem.

Then, the OADM controlling CPU 100 made the optical spectrum analyzer 99 monitor the optical signal exited from the AOTF section 113 after the selection and branching via the optical coupler 115 and the optical SW 97 to judge whether or not the desired optical signal has been selected and branched and measure the level of the selection and branching (#45).

The OADM controlling CPU 100 receives the data from the optical spectrum analyzer 99 and transmits the selection and branching level to the branch side AOTF controlling CPU 123. It also transmits a warning to the branch side AOTF controlling CPU 123 when the selection and branching ch is wrong (#46).

Then, the branch side AOTF controlling CPU 123 judges whether or not the received selection and branching level is greater than the selection and branching level threshold value βdr (dBm) stored in the EEPROM 125. When the received selection and branching level is smaller than βdr and the warning is received, the branch side AOTF controlling CPU 123 scans ch 1 again (#47).

The branch side AOTF controlling CPU 123 calculates the frequency of the radio-frequency signal corresponding to ch to be received and processed and applies the radio-frequency signal of that frequency to the AOTF sections 112 and 113 to cause the optical receiver 116 to receive the desired ch (#48).

It is noted that the relationship between the frequency of the radio-frequency signal and the selected wavelength has been computed by scanning ch 1 in the above explanation, this relationship may be computed by scanning another ch. In this case, the branch side AOTF controlling CPU 123 controls the processes of #32 through #43 by counting the number of maximum values and by setting the frequency of the radio-frequency signal giving the output value of the A/D 121 the maximum value corresponding to ch 1 as scan starting RF frequency fadr (MHz) for scanning the maximum value of ch 2. Then, it increments the counted value of the maximum values by 1 and controls the processes of #32 through #43 by setting the frequency of the radio-frequency signal giving the output value of the A/D 121 the maximum value corresponding to ch 2 as scan starting RF frequency fadr (MHz) for scanning the maximum value of ch 3. The branch side AOTF controlling CPU 123 carries out the similar controls one after another thereafter until reaching to a targeted ch and computes the relationship between the frequency of the radio-frequency signal and the selected wavelength by using frequency of the radio-frequency signal at this time and others.

It is also possible to provide a RAM for storing data by sending/receiving data to/from the branch side AOTF controlling CPU 123 further besides the EEPROM 125 to scan all of the ch of 32 waves.

Since the OADM searches for the frequency of the radio-frequency signal for selecting and branching the desired ch before the optical receiver 116 receives and processes of the optical signal of the desired ch as described above, it can compensate for frequency shift of the radio-frequency signal caused by temperature change and the like. Therefore, it can receive and process of the optical signal of the desired ch accurately.

Next, the adding part will be explained.

The structure of the adding part of the eighth embodiment will be explained at first.

Figure 17:
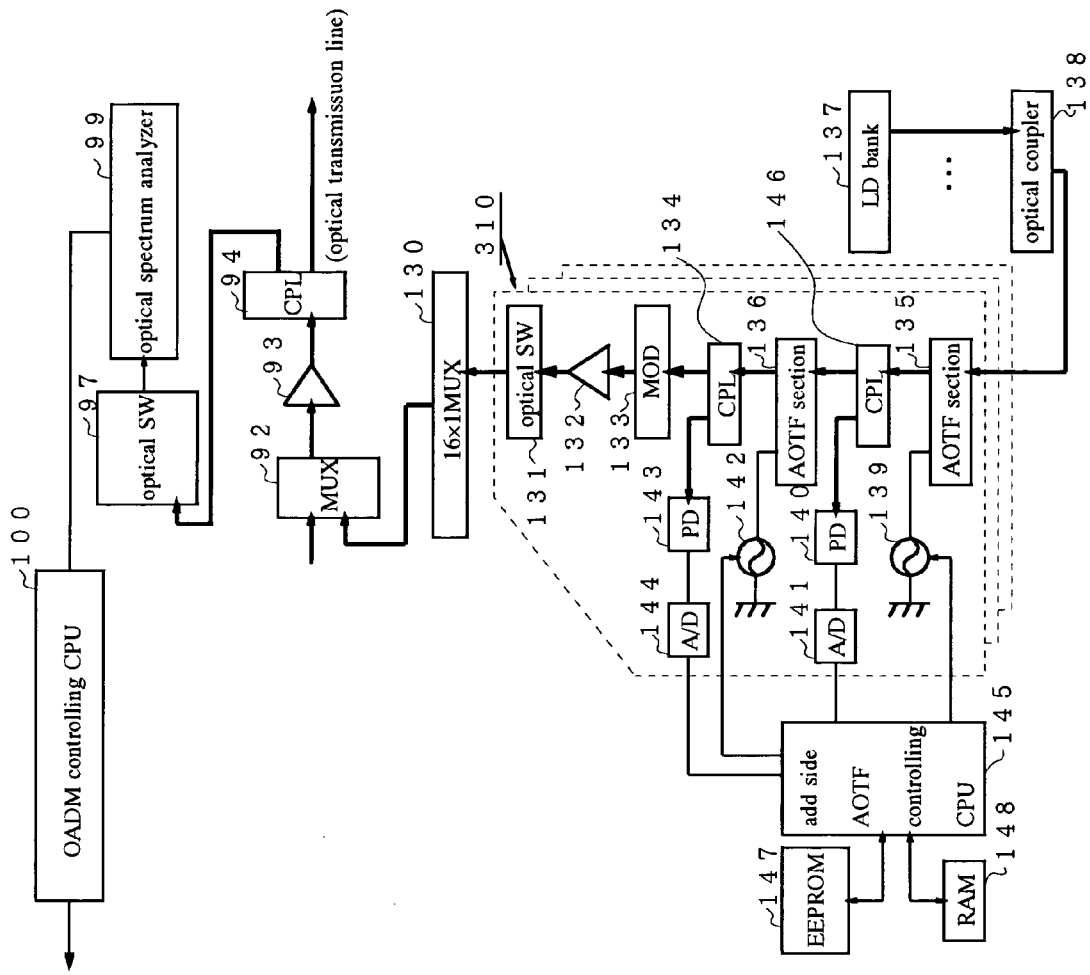
FIG. 17 is a block diagram showing a structure of an adding part of the OADM according to the eighth embodiment.

FIG. 17 is a block diagram showing the structure of the adding part of the OADM of the eighth embodiment. The part for generating an optical signal to be added comprises AOTF sections 135 and 136, radio-frequency signal sources 139 and 142, PDs 140 and 143, A/Ds 141 and 144, optical couplers 134, 138, and 146, an optical modulator 133, an optical amplifier 132, and an optical SW 131. It is noted that while there are 16 such parts to generate 16 waves of add signals, only one part for generating one wave among them will be shown in FIGS. 12 and 17 and the others are not shown in the figures because their structure is the same. An explanation thereof is also the same, so that only part for generating one wave will be explained below.

In FIG. 17, an LD bank 137 comprising 32 LDs for generating lights of wavelengths corresponding to the respective optical signals of the 32 waves of a WDM optical signal generates 32 waves of laser lights having different wavelengths and makes it enter the optical coupler 138. The entered laser lights of 32 waves are wavelength-multiplexed by the optical coupler 138 and are then distributed to 16 lights. Accordingly, the lights of 32 wavelengths are contained in one distributed port.

The distributed laser lights enter the AOTF section 136. The AOTF section 136 selects and branches a light of a specific wavelength out of the entered 32 waves of a WDM optical signal) corresponding to the frequency of the radio-frequency signal applied by the radio-frequency signal source 139 which generates the radio-frequency signal. The non-selected light is abandoned as it is. On the other hand, the light selected and branched by the AOTF section 136 is branched by the optical coupler 146 which branches light into two. One light branched by the optical coupler 146 enters the PD 140 which receives the light and detects the light intensity.

The PD 140 outputs an electrical signal on the level corresponding to the intensity of the received light to the A/D 141. The A/D 141 converts the received analog signal into a digital signal and transmits it to an addition side AOTF controlling CPU 145. The addition side AOTF controlling CPU 145 receives/transmits data from/to an EEPROM 147 storing data such as scan starting RF frequency, scan ending RF frequency, scan RF power, and the values of changing the selected wavelength with respect to changing frequency of a unit radio-frequency signal and controls the AOTF sections 135 and 136, the radio-frequency signal sources 139 and 142, and others as described later. The addition side AOTF controlling CPU 145 also receives/transmits data from/to a RAM 148 storing the frequency of the radio-frequency signal being applied and output values of the A/Ds 141 and 144 at that time.

The addition side AOTF controlling CPU 145 also controls the frequency and power of the radio-frequency signal generated by the radio-frequency signal source 139.

On the other hand, the other optical signal branched by the optical coupler 146 enters the next AOTF 135 for selecting and branching an optical signal of a specific wavelength out of the entered optical signal corresponding to the frequency of the radio-frequency signal applied by the radio-frequency signal source 142 for generating the radio-frequency signal. The AOTF section 135 selects and branches the same ch with that of the AOTF section 136 again. The two AOTFs are connected in tandem as described above for the purpose of narrowing a full width half maximum of the selected light since the range of the characteristic for selecting the wavelength of the AOTF is wide. It becomes possible to lessen the influence to the ch neighboring to the ch of the wavelength of this laser by thus narrowing the full width half maximum.

The optical signal selected and branched by the AOTF section 136 enters the optical coupler 134 which branches light into two. One optical signal branched by the optical coupler 134 enters the PD 143 which receives the optical signal and detects the light intensity.

The PD 143 outputs an electrical signal on the level corresponding to the intensity of the received light to the A/D 144. The A/D 144 converts the received analog signal into a digital signal and transmits it to the addition side AOTF controlling CPU 145.

The addition side AOTF controlling CPU 145 also controls the frequency and power of the radio-frequency signal generated by the radio-frequency signal source 142.

On the other hand, the other optical signal branched by the optical coupler 134 enters the optical modulator 133 for modulating entered light in accordance to information being outputted. The entered LD is modulated to be an optical signal being added by this optical modulator 133. This optical signal is amplified by the optical amplifier 132 which amplifies light intensity and then enters the optical SW 131.

The optical SW 131 switches the entered optical signal to be entered to the following 16×1 optical multiplexer 130 or to an optical waveguide to which nothing is connected. This switching is performed by the addition side AOTF controlling CPU 145. It is switched to enter the optical waveguide to which nothing is connected in scanning the frequency of the radio-frequency signal to find the relationship between the frequency of the radio-frequency signal and the selected wavelength. And it is switched to enter the 16×1 optical multiplexer 130 in entering the 16×1 optical multiplexer 130 to add the optical signal. It is possible to prevent the non-selected light from entering the 16×1 optical coupler 130 while scanning the frequency of the radio-frequency signal to find the relationship between the frequency of the radio-frequency signal and the selected wavelength by providing the optical SW 131 as described above. Accordingly, the non-selected light is not transmitted to the optical transmission line via the optical coupler 92, the optical amplifier 93, and the optical coupler 94 so that it will not crosstalk with the WDM optical signal transmitting through the optical transmission line.

The optical signal exited from the optical SW 131 enters the 16×1 optical multiplexer 130, by which it is wavelength-multiplexed with another optical signal being added and then enters the optical coupler 92.

The optical signal which has been wavelength-multiplexed and entered to the optical coupler 92 is wavelength-multiplexed with the optical signal which is not rejected by the rejecting part as described before and is exited to the optical transmission line as the WDM optical signal via the optical amplifier 93 and the optical coupler 94 to be transmitted to the next node.

Next, the control of the addition side AOTF controlling CPU 145 in the AOTF sections 135 and 136 will be explained.

Receiving a permission of addition from the OADM controlling CPU 100, the addition side AOTF controlling CPU 145 discriminates a ch of optical signal to be generated (#51).

Then, the addition side AOTF controlling CPU 145 switches the optical SW 131 to enter the optical waveguide to which nothing is connected (#52).

The control for finding the relationship between the frequency of the radio-frequency signal and the selected wavelength thereafter may be considered to be the same with the control from #42 to #48 described before, so that its explanation will be omitted here.

The addition side AOTF controlling CPU 145 calculates the frequency of the radio-frequency signal corresponding to the ch being added and applies the radio-frequency signal of that frequency to the AOTF sections 135 and 136 to enter light of the desired ch to the optical modulator 133. The optical modulator 133 modulates the light of the desired ch based on the information being outputted to generate the optical signal being added (#53).

Since the OADM finds the frequency of the radio-frequency signal for selecting and branching the ch before generating the optical signal of the desired ch as described above, it can compensate for the frequency shift of the radio-frequency signal due to temperature change or the like. Accordingly, it can add the optical signal of the desired ch accurately.

On the other hand, when the OADM operates as an optical spectrum analyzer, the addition side AOTF controlling CPU 145 controls in the same manner with the control from #32 to #44 except that it stores the maximum value of output values from the A/Ds 141 and 144 with respect to the frequency and power of the radio-frequency signal when the scan frequency is changed during the control from #32 to #44 described above in the RAM 145, so that its explanation will be omitted here.

Then, based on the relationship between the frequency of the radio-frequency signal and the selected wavelength, the addition side AOTF controlling CPU 145 correlates the output values from the A/Ds 141 and 144 with a wavelength of the laser.

The OADM may be used as the optical spectrum analyzer for detecting the wavelength of the laser and its light intensity at that moment by controlling as described above.

Next, the overall control of the OADM of the eighth embodiment in adding/dropping an optical signal will be explained.

In FIGS. 12, 13, 16, and 17, the OADM controlling CPU 100 transmits a signal indicating a ch to be rejected to the rejecting side AOTF controlling CPU 87.

Receiving the signal, the rejecting side AOTF controlling CPU 87 implements the control from #1 to #19 described above and transmits a signal indicating that the desired ch has been rejected to the OADM controlling CPU 100. Then, the rejecting side AOTF controlling CPU 87 implements tracking as described above to maintain the optimum rejecting state.

Receiving the signal, the OADM controlling CPU 100 confirms that the desired ch has been rejected via the optical coupler 91, the optical switch 97, and the optical spectrum analyzer 99, transmits a signal indicating an optical signal of a ch to be received and processed to the branch side AOTF controlling CPU 123, and then transmits a signal indicating a ch to which the optical signal should be added to the addition side AOTF controlling CPU 145.

Receiving the signal, the branch side AOTF controlling CPU 123 implements the control from #31 to #48 described above and transmits a signal indicating that the optical signal of the desired ch has been performed the receiving process to the OADM controlling CPU 100.

Then, receiving the latter signal, the addition side AOTF controlling CPU 145 also implements the control from #51 to #53 described above and transmits a signal indicating that the optical signal of the desired ch has been generated to the OADM controlling CPU 100. Receiving this signal, the OADM controlling CPU 100 confirms that the optical signal of the desired ch has been added via the optical coupler 94, the optical SW 97 and the optical spectrum analyzer 99.

Thus, the OADM adds/drops the optical signal of the desired ch.

Next, other embodiments of the present invention will be explained.

The structure of the ninth embodiment will be explained at first.

The ninth embodiment is an embodiment of the selected-wavelength tuning filter and the OADM.

Figure 18:
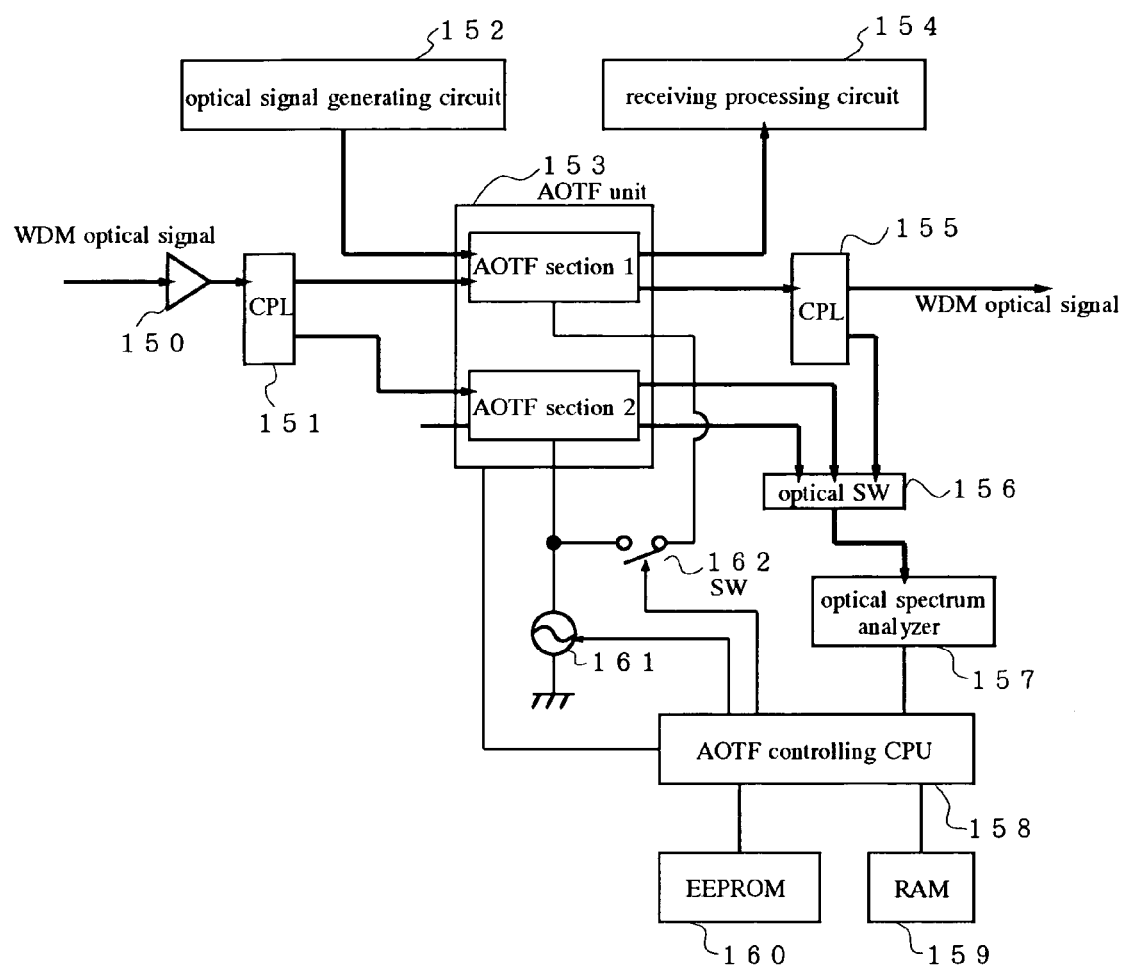
FIG. 18 is a block diagram showing a structure of an OADM according to the ninth embodiment.

FIG. 18 is a block diagram showing the structure of the OADM according to the ninth embodiment.

In FIG. 18, the 32 waves of a WDM optical signal is amplified by an optical amplifier 150 for amplifying light intensity and enters an optical coupler 151. ASE is superimposed to the WDM optical signal by the optical amplifier 150. The optical coupler 151 branches the entered WDM optical signal into two. One branched WDM optical signal enters the input side of an AOTF section 1 in an AOTF unit 153 in which the AOTF section 1 and an AOTF section 2 are formed on one lithium niobate (LiNbO$^3$) substrate. On the other hand, the other branched WDM optical signal enters the input side of the AOTF section 2.

This AOTF unit 153 is controlled by an AOTF control described later so as to keep the two AOTF sections 1 and 2 at the same temperature by a Peltier device not shown.

The AOTF section 1 adds an optical signal entered from an optical signal generating circuit 152 which can generate 16 waves of optical signal to the WDM optical signal corresponding to the frequency of the radio-frequency signal being applied and at the same time in adding, selects and branches an optical signal having a wavelength corresponding to the frequency of this radio-frequency signal out of the WDM optical signal. The radio-frequency signal being applied is generated by a radio-frequency signal source 161 and is applied via a switch 162, which is controlled to be switched by an AOTF controlling CPU 158. The AOTF controlling CPU 158 also controls the frequency and power of the radio-frequency signal generated by the radio-frequency signal source 161.

The branched optical signal enters a receiving processing circuit 154 that can receive and process 16 waves of optical signal and is received and processed. On the other hand, the WDM optical signal passing through the AOTF section 1 is added the optical signal from the optical signal generating circuit 152 and enters an optical coupler 155. The optical coupler 155 branches this WDM optical signal into two and exits one optical signal to the optical transmission line to transmit to the next node. And the other optical signal enters an optical SW 156.

On the other hand, the 32 waves of a WDM optical signal branched by the optical coupler 151 enters the input side of the AOTF section 2 in the AOTF unit 153.

The AOTF section 2 is used to discriminate the relationship between the frequency of the radio-frequency signal and the selected wavelength. The AOTF section 2 selects and branches the optical signal of a specific wavelength out of the entered WDM optical signal corresponding to the frequency of the radio-frequency signal applied by the radio-frequency signal source 161. Both the non-selected WDM optical signal and the selected and branched optical signal enter the optical SW 156.

The optical SW 156 is controlled by the optical spectrum analyzer 157 as to which optical signal entered the optical SW 156 should be entered to the optical spectrum analyzer 157 and enters the specified optical signal to the optical spectrum analyzer 157. The optical spectrum analyzer 157 outputs a wavelength and a light intensity of the detected light to the AOTF controlling CPU 158.

The AOTF controlling CPU 158 stores the wavelength and light intensity of the light received from the optical spectrum analyzer 157 in RAM 159. The AOTF controlling CPU 158 also transmits/receives data to/from an EEPROM 160 storing data such as ASE rejecting RF frequency, ASE rejecting RF power, and the values of changing the selected wavelength with respect to changing frequency of a unit radio-frequency signal and controls the AOTF unit 153, the radio-frequency signal source 161, and the switch 162 as described later.

Next, the operation and effect of the ninth embodiment will be explained.

The AOTF controlling CPU 158 discriminates the relationship between the frequency of the radio-frequency signal and the selected wavelength at that temperature by using the AOTF section 2 before adding/dropping the optical signal by the AOTF section 1.

Since the AOTF section 1 and the AOTF section 2 are formed on the same substrate, various characteristics such as the values of changing the selected wavelength with respect to changing frequency of the unit radio-frequency signal are substantially the same. Further, since the AOTF section 1 and the AOTF section 2 are kept at the same temperature by the Pelitier device, the discriminated relationship between the frequency of the radio-frequency signal and the selected wavelength in the AOTF section 2 applies to the AOTF section 1 as it is.

Then, the relationship between the frequency of the radio-frequency signal and the selected wavelength can be discriminated without influencing the WDM optical signal transmitting through the optical transmission line. And the discriminated result is used so that the desired optical signal can be added/dropped accurately out of the WDM optical signal transmitting through the optical transmission line.

Next, the procedure for finding the relationship between the frequency of the radio-frequency signal and the selected wavelength will be explained.

The AOTF controlling CPU 158 turns off the switch 162 so as not to apply the radio-frequency signal from the radio-frequency signal source 161 to the AOTF section 1 (#61).

The AOTF controlling CPU 158 reads the ASE rejecting RF frequency and the ASE rejecting RF power stored in the EEPROM 160 and transmits these data to the radio-frequency signal source 161 (#62).

The radio-frequency signal source 161 generates the radio-frequency signal of the received frequency and power and applies it to the AOTF section 1 (#63).

The AOTF controlling CPU 158 controls the optical spectrum analyzer 157 so as to monitor the optical signal which is neither selected nor branched by the AOTF section 2 and passes through the AOTF section 2. The optical spectrum analyzer 157 instructs the optical SW 156 so as to enter the optical signal neither selected nor branched by the AOTF section 2 to the optical spectrum analyzer 157 (#64).

Then, the optical spectrum analyzer 157 monitors a wavelength of light and a light intensity in that wavelength across the wavelength band of the WDM optical signal and transmits its result to the AOTF controlling CPU 158 (#65).

The AOTF controlling CPU 158 stores these received data once in the RAM 159 (#66) and analyzes the stored data to retrieve a dent of the ASE (#67).

While the retrieval is performed by setting a certain threshold value and by discriminating the minimum value of light intensity within a range of the light intensity below that threshold value, this method may be performed by the similar concept with the method for finding the maximum value explained in the eighth embodiment.

Then, the AOTF controlling CPU 158 calculates the frequency of the radio-frequency signal for selecting and branching each ch from the wavelength which sets the intensity at the maximum value, the ASE rejecting RF frequency, the values of the changing the selected wavelength with respect to the changing frequency of the unit radio-frequency signal, and each ch interval (#68).

Then, the AOTF controlling CPU 158 controls the radio-frequency signal source 161 so as to generate the frequency of the radio-frequency signal corresponding to the desired ch. It also controls the optical spectrum analyzer 157 so as to monitor the optical signal selected and branched by the AOTF section 2. The optical spectrum analyzer 157 instructs the optical SW 156 so as to enter the optical signal selected and branched by the AOTF section 2 to the optical spectrum analyzer 157 (#69).

The optical spectrum analyzer 157 transmits the monitor result to the AOTF controlling CPU 158 and the AOTF controlling CPU 158 confirms whether or not the optical signal of the desired ch has been branched (#70).

When the optical signal of the desired ch has been branched as the result of the confirmation, the AOTF controlling CPU 158 turns on the switch 162 so that the frequency of the radio-frequency signal corresponding to the desired ch generated by the radio-frequency signal source is applied to the AOTF section 1 (#71). Thus, the optical signal of the desired ch is branched/added accurately.

When the optical signal of the desired ch has not been branched as a result of the confirmation, the AOTF controlling CPU 158 repeats the processes from #61 to #70.

Since the OADM finds the frequency of the radio-frequency signal for branching/adding the ch by the AOTF section 2 for confirming the radio-frequency signal before branching/adding the optical signal of the desired ch as described above, it can compensate for the frequency shift of the radio-frequency signal caused by temperature change or the like. Accordingly, it can receive and process the optical signal of the desired ch accurately.

It is noted that the dent of the ASE has been discriminated from the optical signal which has passed through the AOTF section 2 by the optical spectrum analyzer 157 in the ninth embodiment, it is possible to discriminate the ASE selected and branched by the AOTF section 2 directly by the optical spectrum analyzer 157 and to compute the relationship between the frequency of the radio-frequency signal and the selected wavelength from the wavelength of the ASE and the frequency of the radio-frequency signal at that time.

Further, although the dent of the ASE has been discriminated in the ninth embodiment by the similar concept with the method for finding the maximum value according to the eighth embodiment, it may be discriminated by finding the difference between an output value of the optical spectrum analyzer 157 when the ASE rejecting RF frequency is applied to the AOTF section 2 and an output value of the optical spectrum analyzer 157 when no ASE rejecting RF frequency is applied to the AOTF section 2.

Next, another embodiment will be explained.

The structure of the tenth embodiment will be explained.

The tenth embodiment is an embodiment of the selected-wavelength tuning filter and the OADM.

Figure 19:
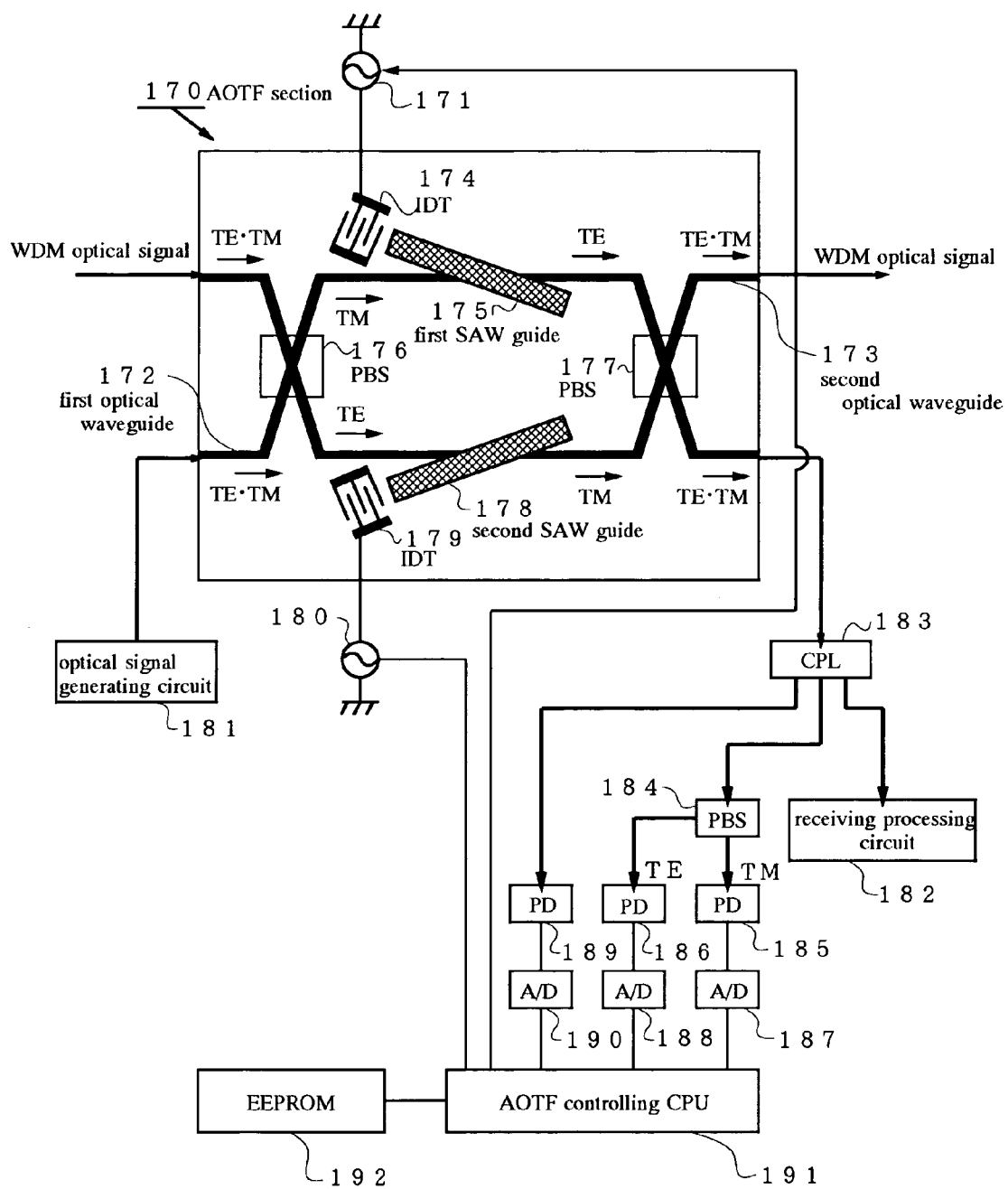
FIG. 19 is a block diagram showing a structure of an OADM according to the tenth embodiment.
Figure 20:
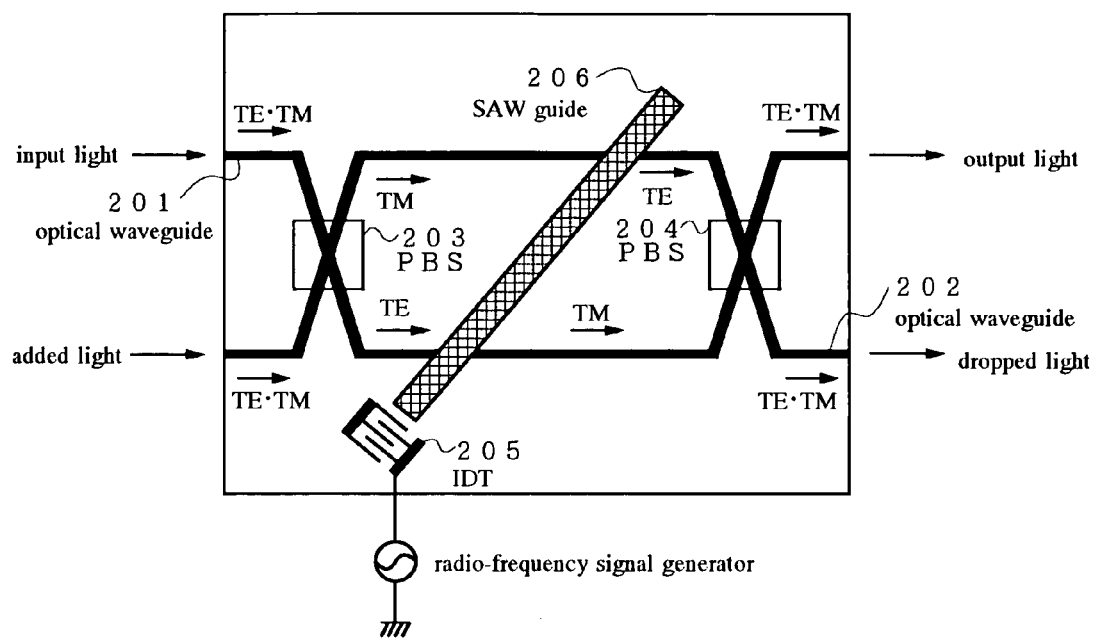
FIG. 20 is a block diagram showing a structure of a conventional AOTF.
Figure 21:
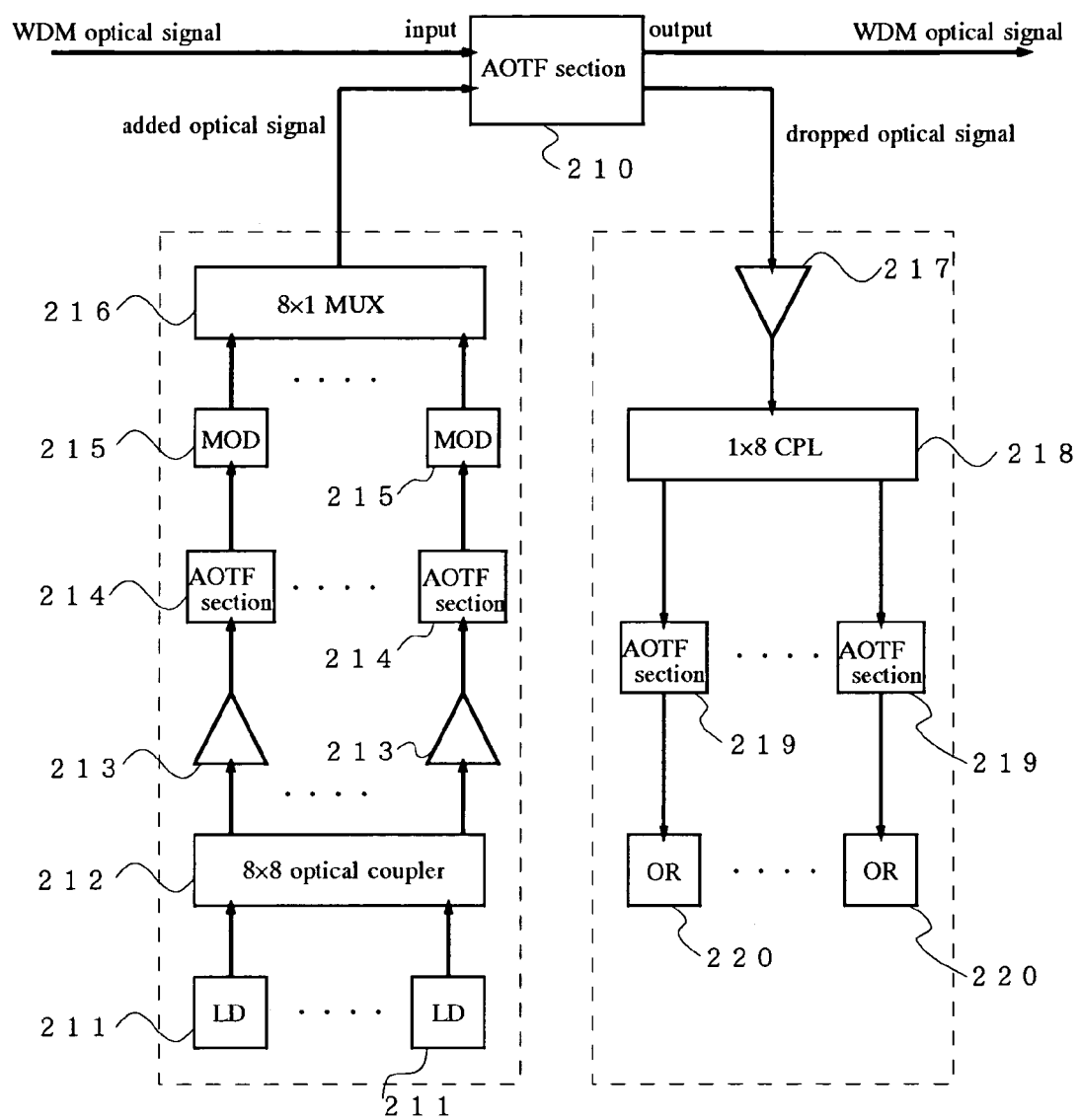
FIG. 21 is a block diagram showing the first basic structure of the OADM using an AOTF.
Figure 22:
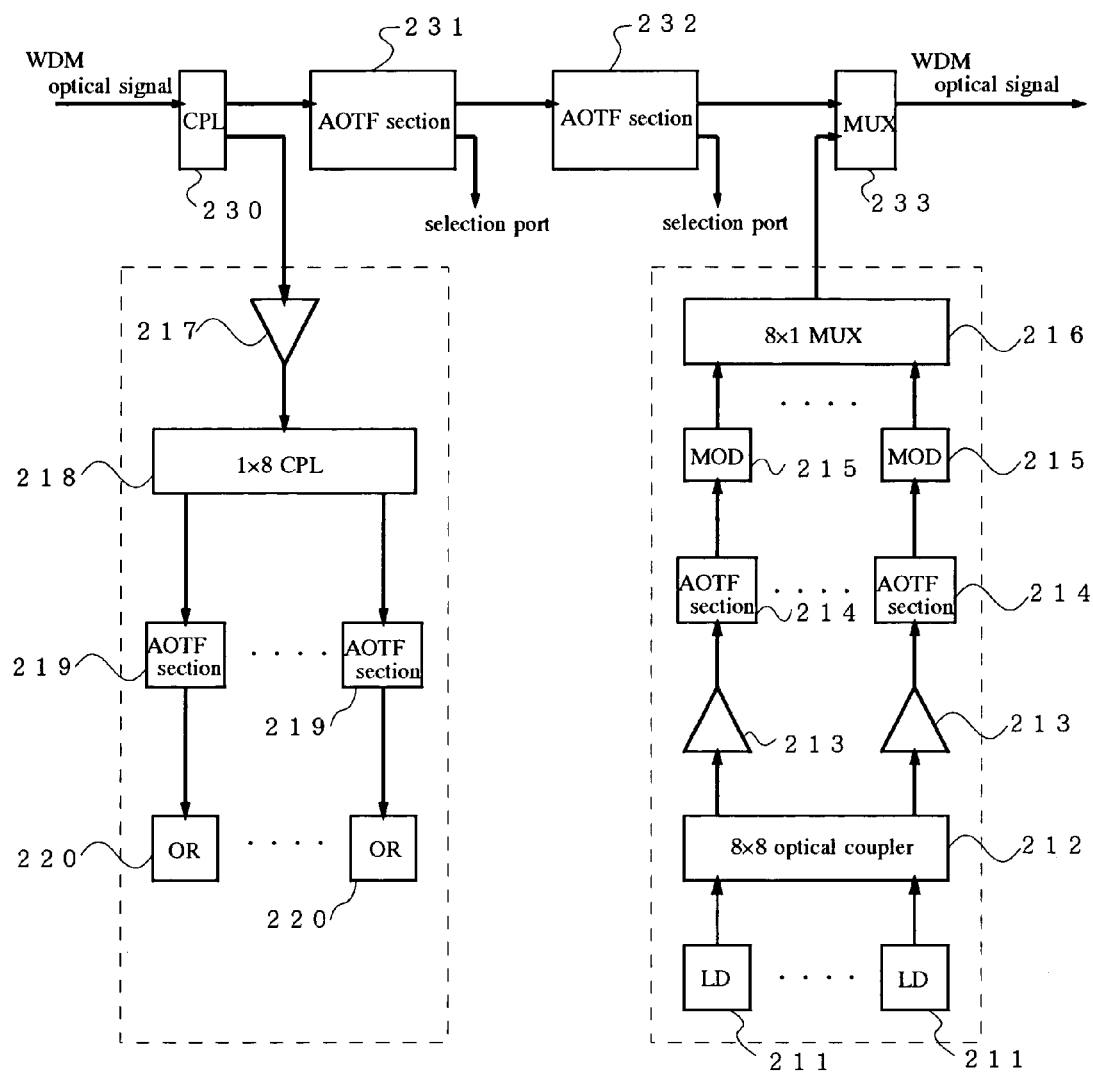
FIG. 22 is a block diagram showing the second basic structure of the OADM using the AOTF.

FIG. 19 is a block diagram showing the structure of the OADM according to the tenth embodiment In FIG. 19, an AOTF section 170 comprises the first optical waveguide 172 and the second optical waveguide 173 formed on a substrate of lithium niobate ($LiNbO^3$) which has a piezoelectric effect. These optical waveguides 172 and 173 cross each other at two places and PBSs 176 and 177 are provided at these two crossing parts.

The PBS 176 separates a WDM optical signal entered from an optical transmission line to the first optical waveguide 172 into TM and TE mode lights. The separated TM mode WDM optical signal propagates in the first optical waveguide 172 and the separated TE mode WDM optical signal propagates in the second optical waveguide 173. The PBS 176 also separates an optical signal to be added which has been entered the first optical waveguide 172 from the optical signal generating circuit 181 for generating 8 waves of optical signal into TM and TE mode lights. The separated TM mode added optical signal propagates in the first optical waveguide 172 and the separated TE mode optical signal propagates in the second optical waveguide 173.

The first SAW guide 175 made of metallic film is formed on the first optical waveguide 172 between the PBSs 176 and 177. A surface acoustic wave generated when the radio-frequency signal is applied to the first IDT 174 as an electrode in the shape of interlocking combs propagates through the first SAW guide 175. The radio-frequency signal applied to the first IDT 174 is generated by a radio-frequency signal source 171. The frequency and intensity of the radio-frequency signal are controlled by an AOTF controlling CPU 191 described later.

The second SAW guide 178 made of metallic film is formed on the second optical waveguide 173 between the PBSs 176 and 177. A surface acoustic wave generated when the radio-frequency signal is applied to the second IDT 179 as an electrode in the shape of interlocking combs propagates through the second SAW guide 178. The radio-frequency signal applied to the second IDT 179 is generated by a radio-frequency signal source 180. The frequency and intensity of the radio-frequency signal are controlled by the AOTF controlling CPU 191.

Periodic change of refractive index occurs due to the surface acoustic wave on the first optical waveguide 172 at the part crossing with the first SAW guide 175. Then, only the wavelength which interacts with this periodic change of the refractive index among the TM mode WDM optical signal and the addition optical signal which propagate through the first optical waveguide 172 is switched from the TM mode to the TE mode. In the same manner, periodic change of refractive index occurs due to the surface acoustic wave on the second optical waveguide 173 at the part crossing with the second SAW guide 178. Then, only the wavelength which interacts with this periodic change of the refractive index among the TE mode WDM optical signal and the addition optical signal which propagate through the second optical waveguide 173 is switched from the TE mode to the TM mode.

Then, the PBS 177 changes the propagating direction of the WDM optical signal and addition optical signal which have the switched TE mode and TM mode. Therefore, only the WDM optical signal of the interacting wavelength propagates through the first optical waveguide 172, is branched as a branched optical signal and enters an optical coupler 183. On the other hand, the WDM optical signal of the wavelength that has not interacted propagates in the second optical waveguide 173, passes therethrough as a passing WDM optical signal and is exited to the optical transmission line.

The addition optical signal of the interacting wavelength is added to the passing WDM optical signal, propagates in the second optical waveguide 173 and is exited to the optical transmission line as a WDM optical signal.

The branched optical signal entered to the optical coupler 183 is branched into three signals by the optical coupler 183. The first branched optical signal enters a receiving processing circuit 182 that can receive and process 8 waves of optical signal.

The second branched optical signal enters a PBS 184 to be separated into TM mode and TE mode. The separated TM mode optical signal enters a PD 185 for receiving the branched optical signal to detect its light intensity. The PD 185 outputs an electrical signal on the level corresponding to the intensity of the received light to an A/D 187. The A/D 187 converts the received analog signal into a digital signal and transmits it to the AOTF controlling CPU 191. In the same manner, the separated TE mode optical signal enters a PD 186 for receiving the branched optical signal to detect its light intensity. This PD 186 outputs an electrical signal on the level corresponding to the intensity of the received light to an A/D 188. The A/D 188 converts the received analog signal into a digital signal and transmits it to the AOTF controlling CPU 191.

The third branched optical signal enters a PD 189 for receiving the branched signal to detect its light intensity. This PD 189 outputs an electrical signal on the level corresponding to the intensity of the received light to an A/D 190. The A/D 190 converts the received analog signal into a digital signal and transmits it to the AOTF controlling CPU 191.

The AOTF controlling CPU 191 transmits/receives data to/from an EEPROM 192 storing various data and controls the radio-frequency signal sources 171 and 180 as described later.

Next, the operation and effect of the tenth embodiment will be explained.

Before adding/dropping optical signal(s) by the AOTF section 170, the AOTF controlling CPU 191 discriminates the relationship between the frequency of the radio-frequency signal and the selected wavelength at that temperature by applying output values of the PD 189 received via the A/D 190. More specifically, it discriminates as follows.

The AOTF controlling CPU 191 reads TM mode scan starting RF frequency, TE mode scan starting RF frequency and scan starting RF power stored in the EEPROM 192 (#80).

The AOTF controlling CPU 191 transmits the TM mode scan starting RF frequency and scan starting RF power to the radio-frequency signal source 171 and transmits the TE mode scan starting RF frequency and scan starting RF power to the radio-frequency signal source 180 (#81).

Then, the AOTF controlling CPU 191 discriminates the maximum value when the frequency of the radio-frequency signal applied to the first optical waveguide 172 is equal with the frequency of the radio-frequency signal applied to the second optical waveguide 173 by controlling the radio-frequency signal sources 171 and 180 so that the frequency of the radio-frequency signal source 171 coincides always with that of the radio-frequency signal source 180 as well as by controlling in the same manner with the processes from #34 to #41 according to the eighth embodiment (#82). The frequency of the radio-frequency signal at this time will be called the "common maximum frequency".

Then, the AOTF controlling CPU 191 fixes the frequency of the radio-frequency signal source 180 for applying the radio-frequency signal to the second optical waveguide 173 at the common maximum frequency at first and scans the frequency of the radio-frequency signal source 171 for applying the radio-frequency signal to the first optical waveguide 172 within a certain range in the vicinity of the common maximum frequency to discriminate the maximum value with respect to the TM mode by the similar concept with the Steps #4 through #11 according to the eighth embodiment (#83).

Next, the AOTF controlling CPU 191 fixes the radio-frequency signal source 171 for applying the radio-frequency signal to the first optical waveguide 172 at the frequency which has been discriminated in Step #83 and which sets the output value at the maximum value and scans the radio-frequency signal source 180 for applying the radio-frequency signal to the second optical waveguide 173 within a certain range in the vicinity of the common maximum frequency to discriminate the maximum value with respect to the TE mode by the similar concept with Steps #4 through #11 according to the eighth embodiment (#84).

It is also possible to discriminate the maximum value with respect to the TE mode by fixing the radio-frequency signal source 171 in Step #83 and to discriminate the maximum value with respect to the TM mode by fixing the radio-frequency signal source 180 in Step #84.

Then, the AOTF controlling CPU 191 calculates the relationship between the frequency and the selected wavelength of the radio-frequency signal in the TM mode for selecting and branching each ch from the frequency of the radio-frequency signal which sets A/D 190 at the maximum value of the TM mode, the wavelength of ch 1, the value of changing the selected wavelength with respect to the changing frequency of the unit radio-frequency signal and each ch interval (#85).

The AOTF controlling CPU 191 also calculates the relationship between the frequency and the selected wavelength of the radio-frequency signal in the TE mode for selecting and branching each ch from the frequency of the radio-frequency signal which sets A/D 190 at the maximum value of the TE mode, the wavelength of ch 1, the value of changing the selected wavelength with respect to the changing frequency of the unit radio-frequency signal and each ch interval (#86).

Since the OADM finds the frequency of the radio-frequency signal for adding/dropping the ch before adding/dropping the optical signal of the desired ch as described above, it can compensate for the frequency shift of the radio-frequency signal caused by temperature change or the like. Further, although the optimum frequency of the radio-frequency signal for switching the TE mode to the TM mode and the optimum frequency of the radio-frequency signal for switching the TM mode to the TE mode are different from each other, the OADM of the tenth embodiment can add/drop the optical signal of the specific wavelength accurately because it can apply the radio-frequency signals of the different frequencies to the respective modes and can adjust accurately by configuring as described above.

When the polarized light rotates slowly in the optical transmission line, i.e., when the polarized light rotates slower than time during which the AOTF controlling CPU 191 transmits data of the frequency to the radio-frequency signal sources 171 and 180 and an output value of the A/D 190 with respect to the frequency is obtained, the relationship between the frequency of the radio-frequency signal and the selected wavelength in the TM mode and the relationship between the frequency of the radio-frequency signal and the selected wavelength in the TE mode may be obtained more accurately by applying not the output value of the A/D 190 but the output value of the A/Ds 187 and 188.

In this case, an average value of the output value of the A/D 187 and the output value of the A/D 188 is applied instead of the output value of the A/D 190 in Steps #80 through #82. Then, the output value of the A/D 188 in the TE mode is applied instead of the output value of the A/D 190 in discriminating the maximum value with respect to the TM mode in Step #83 and the output value of the A/D 187 in the TE mode is applied instead of the output value of the A/D 190 in discriminating the maximum value with respect to the TE mode in Step #84. Thus, the AOTF controlling CPU 191 calculates the relationship between the frequency of the radio-frequency signal and the selected wavelength in the TM mode and the relationship between the frequency of the radio-frequency signal and the selected wavelength in the TE mode by controlling Steps #80 through #86.

The interaction between the optical signal propagating through the first optical waveguide 172 and the radio-frequency signal applied by the radio-frequency signal source 171 may be discriminated more strictly and the interaction between the optical signal propagating through the second optical waveguide 173 and the radio-frequency signal applied by the radio-frequency signal source 180 may be discriminated more strictly because the branched optical signal is separated into each mode by the PBS 184. Therefore, the OADM of the tenth embodiment can add/drop the optical signal of the specific wavelength more accurately.

While the preferred embodiments have been described, variations thereto will occur to those skilled in the art within the scope of the concepts of the present invention which are delineated by the following claims.

What is claimed is:

1. A selected-wavelength tuning apparatus comprising:
   an acoustic optical tunable filter (AOTF) receiving a wavelength division multiplexed (WDM) light including a plurality of lights at different wavelengths multiplexed together, and branching the WDM light into a selected-wavelength light and light with other wavelengths in accordance with a radio-frequency signal applied to the AOTF;
   a radio-frequency signal generating means for generating said radio-frequency signal;
   a light intensity detecting means for detecting light intensity of light from said acoustic optical tunable filter; and
   a radio-frequency signal controlling means for controlling said radio-frequency signal generating means so as to select light of a predetermined wavelength in accordance with an output of said light intensity detecting means, wherein
      said radio-frequency signal controlling means comprises
         a maximum value discriminating means for discriminating the maximum value of said light intensity with respect to light of a predetermined wavelength by receiving said light intensity from said light intensity detecting means while changing the frequency of said radio-frequency signal generated by said radio-frequency signal generating means, and
         a frequency controlling means for controlling said radio-frequency signal generating means so as to generate the radio-frequency with the frequency which makes the maximum light intensity discriminated by said maximum value discriminating means,
      said frequency controlling means generates a frequency which is smaller than the frequency of said radio-frequency signal generated by said radio-frequency signal generating means and
      said radio-frequency signal generating means superimposes said frequency generated by said frequency controlling means with said radio-frequency signal.

2. A selected-wavelength tuning apparatus comprising:
   an acoustic optical tunable filter (AOTF) receiving a wavelength division multiplexed (WDM) light including a plurality of lights at different wavelengths multiplexed together, and branching the WDM light into a selected-wavelength light and light with other wavelengths in accordance with a radio-frequency signal applied to the AOTF;
   a radio-frequency signal generating means for generating said radio-frequency signal;
   a light intensity detecting means for detecting light intensity of light from said acoustic optical tunable filter; and
   a radio-frequency signal controlling means for controlling said radio-frequency signal generating means so as to select light of a predetermined wavelength in accordance with an output of said light intensity detecting means, wherein
      said radio-frequency signal controlling means further comprises a reference signal adding means for adding a reference signal whose wavelength is known to an optical input side of said AOTF, and
      said radio-frequency signal controlling means detects said reference signal from the output of said light intensity detecting means and computes the relationship between the selected-wavelength of said AOTF and the radio-frequency based on the detecting result.

3. The selected-wavelength tuning apparatus according to claim 2, wherein the wavelength of said reference signal is a wavelength at an edge of a wavelength band for transmitting said WDM light.

4. A selected-wavelength tuning apparatus comprising:
   an acoustic optical tunable filter (AOTF) receiving a wavelength division multiplexed (WDM) light including a plurality of lights at different wavelengths multiplexed together, and branching the WDM light into a selected-wavelength light and light with other wavelengths in accordance with a radio-frequency signal applied to the AOTF;
   a radio-frequency signal generating means for generating said radio-frequency signal;
   a light intensity detecting means for detecting light intensity of light from said acoustic optical tunable filter;
   a radio-frequency signal controlling means for controlling said radio-frequency signal generating means so as to select light of a predetermined wavelength in accordance with an output of said light intensity detecting means, wherein
      said light intensity detecting means is an optical spectrum analyzer, and
      said radio-frequency signal controlling means generates the radio-frequency signal with a known frequency and computes a relationship between the selected-wavelength and the radio-frequency based on an output of said optical spectrum analyzer; and an optical amplifier connected to an optical input side of said AOTF, wherein said radio-frequency signal controlling means includes means for computing a relationship between the selected-wavelength and the radio-frequency, by utilizing the output of the optical spectrum analyzer at a time the radio-frequency signal with the known frequency is applied to the AOTF and utilizing a characteristic of amplified spontaneous emission light generated at the optical amplifier.

5. A selected-wavelength tuning apparatus comprising:
an acoustic optical tunable filter (AOTF) receiving a wavelength division multiplexed (WDM) light including a plurality of lights at different wavelengths multiplexed together, and branching the WDM light into a selected-wavelength light and light with other wavelengths in accordance with a radio-frequency signal applied to the AOTF;
a radio-frequency signal generating means for generating said radio-frequency signal;
a light intensity detecting means for detecting light intensity of light from said acoustic optical tunable filter;
a radio-frequency signal controlling means for controlling said radio-frequency signal generating means so as to select light of a predetermined wavelength in accordance with an output of said light intensity detecting means;
superimposing means for superimposing a low-frequency signal to said radio-frequency signal; and
tracking means for controlling said radio-frequency signal generating means so as to maintain light intensity of the light of said predetermined wavelength at the maximum by detecting said low-frequency signal from light exited from said AOTF.

6. The selected-wavelength tuning apparatus according to claim 5, a selected-wavelength tuning filter wherein
said tracking means controls said radio-frequency signal generating means within a range of radio-frequency corresponding to a distance of said WDM light.

7. A selected-wavelength tuning apparatus, comprising:
an acoustic optical tunable filter (AOTF) receiving a wavelength division multiplexed (WDM) light including a plurality of lights at different wavelengths multiplexed together, the AOTF comprising:
first polarizing means for branching the received WDM light into TM and TE mode lights,
first radio-frequency signal applying means for applying a first radio-frequency signal to a first optical waveguide which is for propagating the TM mode light branched by said first polarizing means,
second radio-frequency signal applying means, provided independently from the first radio-frequency signal applying means, for applying a second radio-frequency signal independent from said first radio-frequency applying means to a second optical waveguide for propagating the TE mode light branched by said first polarizing means, and
second polarizing means for multiplexing optical signals from said first optical waveguide to which said first radio-frequency signal has been applied and said second optical waveguide to which said second radio-frequency signal has been applied, and branching them as first and second outputs corresponding to a state of polarization;
radio-frequency signal generating means for generating said first and second radio-frequency signals independent of each other;
light intensity detecting means for detecting intensity of light from said AOTF; and
radio-frequency signal control means for controlling said radio-frequency generating means so as to cause the AOTF to select light of a predetermined wavelength from the WDM light in accordance with the output of said light intensity detecting means.

8. The selected-wavelength tuning apparatus according to claim 7, wherein
said radio-frequency signal applying means are two radio-frequency signal applying means, of which the first radio-frequency signal applying means applies the radio-frequency signal to the TM mode light branched by said first polarizing means and the second radio-frequency signal applying means applies the radio-frequency signal to the TE mode light branched by said first polarizing means and
said radio-frequency signal generating means supplies the radio-frequency signals of different frequencies to said first and second radio-frequency signal applying means.

9. The selected-wavelength tuning apparatus according to claim 7, further comprising third polarizing means for branching the lights exited from said first output into TM mode and TE mode lights, and wherein
said light intensity detecting means comprises a first light intensity detecting means for detecting the light intensity of TM mode light exited from said third polarizing means and a second light intensity detecting means for detecting the light intensity of TE mode light exited from said third polarizing means.

10. A selected-wavelength tuning apparatus comprising:
an acoustic optical tunable filter (AOTF) receiving a wavelength division multiplexed (WDM) light, and branching the received WDM light into selected-wavelength light and light with other wavelengths in accordance with a radio-frequency signal applied to the AOTF;
a radio-frequency signal generating unit generating said radio-frequency signal;
a light intensity detecting unit detecting intensity of light from said acoustic optical tunable filter; and
a radio-frequency signal controlling unit controlling said radio-frequency signal generating unit so as to select light of a predetermined wavelength in accordance with an output of said light intensity detecting unit, wherein
said radio-frequency signal controlling unit comprises
a maximum value discriminating unit discriminating a maximum value of said light intensity with respect to light of a predetermined wavelength by receiving said light intensity from said light intensity detecting unit while changing the frequency of said radio-frequency signal generated by said radio-frequency signal generating unit, and
a frequency controlling unit controlling said radio-frequency signal generating unit so as to generate the radio-frequency with the frequency which makes the maximum light intensity discriminated by said maximum value discriminating unit,
said frequency controlling unit generates a frequency which is smaller than the frequency of said radio-frequency signal generated by said radio-frequency signal generating unit and
said radio-frequency signal generating unit superimposes said frequency generated by said frequency controlling unit with said radio-frequency signal.

11. A selected-wavelength tuning apparatus comprising:
an acoustic optical tunable filter (AOTF) receiving a wavelength division multiplexed (WDM) light, and branching the received WDM light into selected-wavelength light and light with other wavelengths in accordance with a radio-frequency signal applied to the AOTF;
a radio-frequency signal generating unit generating said radio-frequency signal;
a light intensity detecting unit detecting intensity of light from said acoustic optical tunable filter; and
a radio-frequency signal controlling unit controlling said radio-frequency signal generating unit so as to select light of a predetermined wavelength in accordance with an output of said light intensity detecting unit, wherein said radio-frequency signal controlling unit further comprises a reference signal adding unit adding a reference signal whose wavelength is known to an optical input side of said AOTF and
said radio-frequency signal controlling unit detects said reference signal from the output of said light intensity detecting unit and computes a relationship between the selected-wavelength of said AOTF and the radio-frequency based on the detecting result.

12. The selected-wavelength tuning apparatus according to claim 11, wherein the wavelength of said reference signal is a wavelength at an edge of a wavelength band transmitting said WDM light.

13. A selected-wavelength tuning apparatus comprising:
an acoustic optical tunable filter (AOTF) receiving a wavelength division multiplexed (WDM) light, and branching the received WDM light into selected-wavelength light and light with other wavelengths in accordance with a radio-frequency signal applied to the AOTF;
a radio-frequency signal generating unit generating said radio-frequency signal;
a light intensity detecting unit detecting intensity of light from said acoustic optical tunable filter;
a radio-frequency signal controlling unit controlling said radio-frequency signal generating unit so as to select light of a predetermined wavelength in accordance with an output of said light intensity detecting unit;
a superimposing unit superimposing a low-frequency signal to said radio-frequency signal; and
a tracking unit controlling said radio-frequency signal generating unit maintaining the light intensity of the optical signal of said predetermined wavelength at the maximum by detecting said low-frequency signal from the optical signal exited from said AOTF.

14. The selected-wavelength tuning apparatus according to claim 13, further comprising a selected-wavelength tuning filter wherein
said tracking unit controls said radio-frequency signal generating unit within a range of radio-frequency corresponding to a distance of said WDM light.

15. A selected-wavelength tuning apparatus, comprising:
an acoustic optical tunable filter (AOTF) receiving a wavelength division multiplexed (WDM) optical input, the AOTF comprising
a first polarizing unit branching the received WDM optical input into TM and TE mode lights,
a first radio-frequency signal applying unit applying first radio-frequency signal to a first optical waveguide which is propagating the TM mode light branched by said first polarizing unit,
a second radio-frequency signal applying unit applying second radio-frequency signal to a second optical waveguide propagating the TE mode light branched by said first polarizing unit, and
a second polarizing unit multiplexing optical signals from said first optical waveguide to which said first radio-frequency signal has been applied and said second optical waveguide to which said second radio-frequency signal has been applied, and branching them as first and second outputs corresponding to a state of polarization;
a radio-frequency signal generating unit generating said radio-frequency signal;
a light intensity detecting unit detecting intensity of light from said AOTF; and
a radio-frequency signal control unit controlling said radio-frequency generating unit so as to select light of a predetermined wavelength in accordance with the output of said light intensity detecting unit.

16. The selected-wavelength tuning apparatus according to claim 15, wherein
said radio-frequency signal applying unit includes two radio-frequency signal applying units, of which the first radio-frequency signal applying unit applies the radio-frequency signal to the TM mode light branched by said first polarizing unit and the second radio-frequency signal applying unit applies the radio-frequency signal to the TE mode light branched by said first polarizing unit and
said radio-frequency signal generating unit supplies the radio-frequency signals of different frequencies to said first and second radio-frequency signal applying unit.

17. The selected-wavelength tuning apparatus according to claim 15, further comprising a third polarizing unit branching the lights exited from said first output into TM mode and TE mode lights, and wherein
said light intensity detecting unit comprises a first light intensity detecting unit detecting the light intensity of TM mode light exited from said third polarizing unit and a second light intensity detecting unit detecting the light intensity of TE mode light exited from said third polarizing unit.

* * * * *